US012739322B2

(12) United States Patent
Zou

(10) Patent No.: US 12,739,322 B2
(45) Date of Patent: Sep. 15, 2026

(54) ALARM SETTING METHOD AND APPARATUS

(71) Applicant: HONOR DEVICE CO., LTD., Shenzhen (CN)

(72) Inventor: Jun Zou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 513 days.

(21) Appl. No.: 18/255,936

(22) PCT Filed: Dec. 13, 2022

(86) PCT No.: PCT/CN2022/138752

§ 371 (c)(1),
(2) Date: Jun. 5, 2023

(87) PCT Pub. No.: WO2023/142735

PCT Pub. Date: Aug. 3, 2023

(65) Prior Publication Data

US 2024/0372939 A1 Nov. 7, 2024

(30) Foreign Application Priority Data

Jan. 27, 2022 (CN) ......................... 202210099401.1

(51) Int. Cl.
*H04M 1/72448* (2021.01)
*G06Q 10/1093* (2023.01)

(52) U.S. Cl.
CPC .... *H04M 1/72448* (2021.01); *G06Q 10/1093* (2013.01)

(58) Field of Classification Search
CPC ....................... G06Q 10/1093; H04M 1/72448
See application file for complete search history.

(56) References Cited

U.S. PATENT DOCUMENTS

2010/0076804 A1 3/2010 Jones
2017/0094046 A1* 3/2017 Raymann .............. G08B 21/06

(Continued)

FOREIGN PATENT DOCUMENTS

CN 102413231 A 4/2012
CN 104008476 A 8/2014

(Continued)

*Primary Examiner* — Beth V Boswell
*Assistant Examiner* — Ashley Y Young

(57) ABSTRACT

Embodiments of this application provide an alarm setting method and apparatus. A terminal device may display a first card when the terminal device receives first travel information, where the first card includes the first travel information and alarm setting information, and the alarm setting information includes a first control and a first time. The terminal device may display a first interface in response to a first operation for the first control, where the first interface is an alarm setting interface on which the first time has been selected. The terminal device may set an alarm corresponding to the first time when an operation of confirming an alarm setting corresponding to the first time is received on the first interface. In this way, the terminal device has already selected the first time in the alarm setting interface, so that the user does not need to manually select the first time.

14 Claims, 20 Drawing Sheets

S501: A terminal device displays a first interface when receiving, on a first card, a first operation for a first control, where the first interface includes a second control

↓

S502: The terminal device adds, in a clock, an alarm corresponding to a first time when receiving a second operation for the second control

(56) References Cited

U.S. PATENT DOCUMENTS

| | | | | |
|---|---|---|---|---|
| 2019/0391537 | A1 * | 12/2019 | Flores | G16H 20/70 |
| 2024/0029533 | A1 * | 1/2024 | Agarwal | G08B 19/00 |
| 2024/0103888 | A1 | 3/2024 | Ding et al. | |

FOREIGN PATENT DOCUMENTS

| | | | |
|---|---|---|---|
| CN | 104468983 | A | 3/2015 |
| CN | 106200359 | A | 12/2016 |
| CN | 107592406 | A | 1/2018 |
| CN | 107734151 | A | 2/2018 |
| CN | 108696636 | A | 10/2018 |
| CN | 109474750 | A | 3/2019 |
| CN | 112468651 | B | 10/2021 |
| CN | 113722028 | A | 11/2021 |
| CN | 113783989 | A | 12/2021 |
| KR | 20190025255 | A | 3/2019 |
| WO | 2021129688 | A1 | 7/2021 |

* cited by examiner

TO FIG. 1c

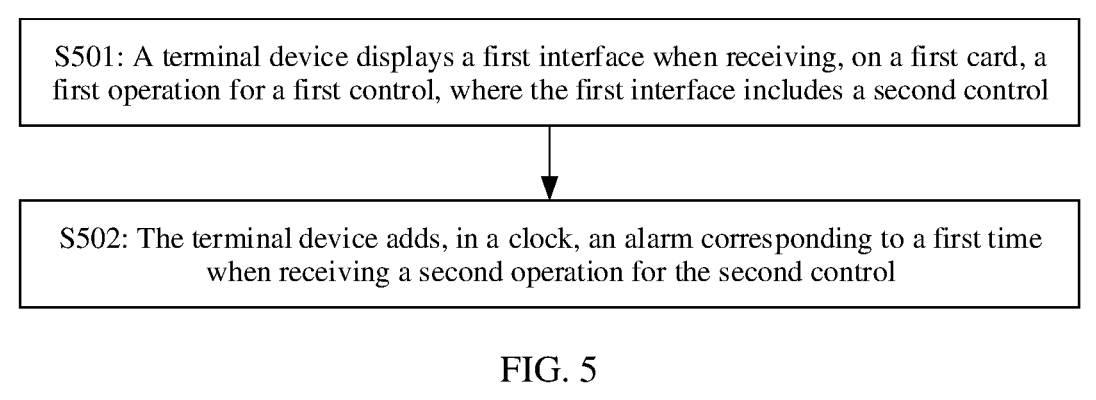

S501: A terminal device displays a first interface when receiving, on a first card, a first operation for a first control, where the first interface includes a second control S502: The terminal device adds, in a clock, an alarm corresponding to a first time when receiving a second operation for the second control

FIG. 5

CONT. FROM FIG. 6b

CONT. FROM FIG. 9a

TO FIG. 9c

CONT. FROM FIG. 9b

ALARM SETTING METHOD AND APPARATUS

CROSS-REFERENCE TO RELATED APPLICATIONS

This application is a national stage of International Application No. PCT/CN2022/138752, filed on Dec. 13, 2022, which claims priority to Chinese Patent Application No. 202210099401.1, filed on Jan. 27, 2022. The disclosures of both of the aforementioned applications are hereby incorporated by reference in their entireties.

TECHNICAL FIELD

This application relates to the field of terminal technologies, and in particular, to an alarm setting method and apparatus.

BACKGROUND

With the increasing development of terminal technologies, a clock on a terminal device provides convenience for travel of a user, for example, the clock can remind the user of a departure time.

Generally, when the terminal device obtains travel information of the user, the terminal device may remind, based on the travel information, the user of a time set in the clock, and the user can set the time in the clock, so that when the time set in the clock is reached, the terminal device may remind the user to depart.

However, an operation process of the foregoing alarm setting manner is cumbersome.

SUMMARY

Embodiments of this application provide an alarm setting method and apparatus, to simplify a process of setting a suggested alarm time by a user, improve efficiency of setting the suggested alarm time by the user, and improve user experience.

According to a first aspect, an alarm setting method is provided, applied to a terminal device. The method includes: displaying, by the terminal device, a first card when the terminal device receives first travel information, where the first card includes the first travel information and alarm setting information, the alarm setting information includes a first control and a first time, and the first time is a suggested alarm time: receiving a first operation for the first control: displaying, by the terminal device, a first interface in response to the first operation, where the first interface is an alarm setting interface on which the first time has been selected; and setting, by the terminal device, an alarm corresponding to the first time when an operation of confirming an alarm setting corresponding to the first time is received on the first interface. Because the terminal device displays the alarm setting interface on which the first time has been selected, a user does not need to manually select the first time. The method improves efficiency of setting the suggested alarm time by the user, and is convenient and flexible, thereby improving user experience.

In a possible implementation, the first travel information includes a first travel start time and a first travel start position, and the displaying, by the terminal device, a first card when the terminal device receives first travel information includes: when the terminal device receives the first travel information, calculating, by the terminal device, a difference between the first travel start time and a first duration to obtain the first time, where the first duration is a sum of a second duration, a third duration, and a fourth duration, the second duration is a duration for traveling from a preset position to the first travel start position, the third duration is a duration for which the user needs to stay at the preset position, and the fourth duration is a duration for which the user needs to stay at the first travel start position: obtaining, by the terminal device, an alarm list, where the alarm list includes a plurality of times; and displaying, by the terminal device, the first card when the terminal device determines that each of the plurality of times is later than the first time: displaying, by the terminal device, the first card when the terminal device determines that one time in the plurality of times is earlier than the first time and that a difference between the one time in the plurality of times and the first time is greater than a first threshold: or displaying, by the terminal device, the first card when the terminal device determines that one time in the plurality of times is earlier than the first time, that a difference between the one time in the plurality of times and the first time is less than or equal to the first threshold, and that a state of an alarm corresponding to the one time in the plurality of times is an off state. In this way, the terminal device may determine, based on different situations, whether to display the first card, so that flexibility of displaying the first card by the terminal device is improved.

In a possible implementation, the calculating, by the terminal device, a difference between the first travel start time and a first duration to obtain the first time includes: integrating, by the terminal device, a software development kit SDK of a map application: obtaining, by the terminal device, the second duration from the software development kit SDK of the map application: calculating, by the terminal device, the sum of the second duration, the third duration, and the fourth duration to obtain the first duration; and calculating, by the terminal device, the difference between the first travel start time and the first duration to obtain the first time. In this way, the terminal device may display the first card after obtaining the first time, thereby providing the user with the suggested alarm time.

In a possible implementation, the alarm list includes a second time, and the calculating, by the terminal device, the sum of the second duration, the third duration, and the fourth duration to obtain the first duration includes: obtaining, by the terminal device, a plurality of fifth durations from a service platform when the terminal device determines that the second time is a wake-up alarm time and that an alarm date corresponding to the second time is within a first date period, where the service platform is configured to serve the terminal device, any duration in the plurality of fifth durations is a duration for which the terminal device stayed at the preset position in history after the second time, and the first date period includes a plurality of dates of workdays: clustering, by the terminal device, the plurality of fifth durations to obtain a plurality of first curves: fitting, by the terminal device, the plurality of first curves into a second curve: when an area ratio of one curve in the plurality of first curves to the second curve is a maximum value, determining, by the terminal device, a duration corresponding to the one first curve in the plurality of first curves as the third duration; and calculating, by the terminal device, the sum of the second duration, the third duration, and the fourth duration to obtain the first duration. The third duration is obtained by the terminal device based on the user's habit. Therefore, for the user, accuracy of the third duration is high: the suggested alarm time provided by the terminal device better conforms to the user's habit; and accuracy of the suggested alarm time is also high.

In a possible implementation, the calculating, by the terminal device, the sum of the second duration, the third duration, and the fourth duration to obtain the first duration includes: obtaining, from the service platform by the terminal device, a plurality of durations for which the terminal device stayed at the first travel start position in history: calculating, by the terminal device, an average duration of the plurality of durations for which the terminal device stayed at the first travel start position in history, to obtain the fourth duration; and calculating, by the terminal device, the sum of the second duration, the third duration, and the fourth duration to obtain the first duration. The fourth duration is obtained by the terminal device based on the user's habit. Therefore, the fourth duration better conforms to the user's habit; and the suggested alarm time provided by the terminal device has high accuracy.

In a possible implementation, the first interface includes a second control, and the setting, by the terminal device, an alarm corresponding to the first time when an operation of confirming an alarm setting corresponding to the first time is received on the first interface includes: setting, by the terminal device, the alarm corresponding to the first time when a second operation for the second control is received. In this way, after the user sets the alarm corresponding to the first time based on the second control, the terminal device may remind, at the first time, the user to depart, thereby improving accuracy of reminding the user to depart.

In a possible implementation, the method further includes: receiving, by the terminal device, second travel information in a case that the second operation for the second control is not received; and deleting, by the terminal device, the first card when the terminal device determines that a state in the second travel information is a first state and that the second travel information and the first travel information meet a first condition, where the first state is used to indicate travel status, and the first state indicates that the travel status is refunded or the travel status is canceled. In this way, after the terminal device deletes the first card, the user does not need to set the alarm corresponding to the first time.

In a possible implementation, the second travel information includes a second travel start position, a second travel start date, a second travel start time, and a second travel identifier, the first travel information includes the first travel start position, the first travel start time, a first travel identifier, and a first travel start date, and that the second travel information and the first travel information meet a first condition includes: the second travel start time is the same as the first travel start time, the second travel identifier is the same as the first travel identifier, the second travel start position is the same as the first travel start position, and the second travel start date is the same as the first travel start date.

In a possible implementation, the method further includes: receiving, by the terminal device, second travel information in a case that the second operation for the second control is not received, where the second travel information includes a second travel start time; obtaining, by the terminal device, a third time based on the second travel start time when the terminal device determines that a state in the second travel information is a second state and that the second travel information and the first travel information meet a second condition, where the third time is a suggested alarm time, the second state is used to indicate travel status, and the second state indicates that the travel status is ticket-changed; and updating, by the terminal device, the first time in the first card to the third time. In this way, the terminal device may update the first time to the third time after the terminal device receives ticket-changing information of a travel, so that the user will not delay the travel if the user sets off based on the third time, thereby improving accuracy of reminding the user to depart.

In a possible implementation, the second travel information further includes a second travel start position, a second travel start date, and a second travel identifier, the first travel information includes the first travel start position, the first travel start time, a first travel identifier, and a first travel start date, and that the second travel information and the first travel information meet a second condition includes: the first travel start date is the same as the second travel start date, the first travel identifier is the same as the second travel identifier, the first travel start position is the same as the second travel start position, and an absolute value of a difference between the second travel start time and the first travel start time is less than or equal to a second threshold.

In a possible implementation, the first travel information includes a first travel start time and a first travel start date, and the displaying, by the terminal device, a first card when the terminal device receives first travel information includes: obtaining, by the terminal device, electricity usage amounts of the terminal device in a plurality of time segments from a service platform when the first travel start time is within a first time segment, where the service platform is configured to serve the terminal device, and the plurality of time segments include a second time segment: subtracting, by the terminal device, a sixth duration from an initial time of the second time segment when the terminal device determines that an electricity usage amount in the second time segment is less than or equal to a third threshold, to obtain a fourth time; and displaying, by the terminal device, the first card when the fourth time is reached on the day before the first travel start date. The second time segment is a sleep time segment of the user. Because the terminal device displays the first card when the fourth time is reached on the day before the first travel start date, the user can see the first card in time. After the user sets the alarm corresponding to the first time based on the first card, accuracy of reminding the user to depart can be improved.

In a possible implementation, the method further includes: deleting, by the terminal device, the first card when the terminal device determines that the initial time of the second time segment is reached on the day before the first travel start date and that the terminal device has not received, on the first interface, the operation of confirming the alarm setting corresponding to the first time. The second time segment is a sleep time segment of the user. Because the user has not set the alarm corresponding to the first time when the initial time of the second time segment is reached on the day before the first travel start date, the user does not need to set the alarm. Therefore, the terminal device is allowed to delete the first card.

In a possible implementation, after the setting, by the terminal device, an alarm corresponding to the first time, the method further includes: receiving, by the terminal device, third travel information: displaying, by the terminal device, a second card when a state in the third travel information is a first state and that the third travel information and the first travel information meet a first condition, where the second card is used to suggest deleting the alarm setting corresponding to the first time, the first state is used to indicate travel status, and the first state indicates that the travel status is refunded or the travel status is canceled: receiving a third operation for the second card: displaying, by the terminal device, a second interface in response to the third operation, where the second interface includes a third control: receiving a fourth operation for the third control; and deleting, by the terminal device, the alarm corresponding to the first time in response to the fourth operation. In this way, after the terminal device receives refund information or cancellation information of the travel, the terminal device deletes the alarm corresponding to the first time, so that the user will not be reminded.

In a possible implementation, the first travel information includes a first travel start position, a first travel start time, a first travel identifier, and a first travel start date, the third travel information includes a third travel start position, a third travel start date, a third travel start time, and a third travel identifier, and that the third travel information and the first travel information meet a first condition includes: the first travel start time is the same as the third travel start time, the third travel identifier is the same as the first travel identifier, the first travel start position is the same as the third travel start position, and the third travel start date is the same as the first travel start date.

According to a second aspect, an embodiment of this application provides an alarm setting apparatus. The alarm setting apparatus may be a terminal device, or may be a component, a chip, or a chip system in the terminal device. The alarm setting apparatus may include a display unit and a processing unit. When the alarm setting apparatus is a terminal device, the processing unit may be a processor, and the display unit may be a display. The alarm setting apparatus may further include a storage unit. The storage unit may be a memory. The storage unit is configured to store instructions. The processing unit executes the instructions stored in the storage unit, so that the terminal device is enabled to perform the method described in the first aspect or any one of the possible implementations of the first aspect. When the alarm setting apparatus is a component, a chip, or a chip system in the terminal device, the processing unit may be a processor, and the display may be a display. The processing unit executes the instructions stored in the storage unit, so that the terminal device is enabled to perform the method according to the first aspect or any one of the possible implementations of the first aspect. The storage unit may be a storage unit (for example, a register or a cache) in the chip, or a storage unit (for example, a read-only memory or a random access memory) in the terminal device and outside the chip.

For example, the processing unit is configured to display a first card when the terminal device receives first travel information, where the first card includes the first travel information and alarm setting information, the alarm setting information includes a first control and a first time, and the first time is a suggested alarm time. The processing unit is further configured to receive a first operation for the first control. The processing unit is further configured to display a first interface in response to the first operation, where the first interface is an alarm setting interface on which the first time has been selected. The processing unit is further configured to set an alarm corresponding to the first time when an operation of confirming an alarm setting corresponding to the first time is received on the first interface.

In a possible implementation, the first travel information includes a first travel start time and a first travel start position. The processing unit is specifically configured to: when the terminal device receives the first travel information, calculate a difference between the first travel start time and a first duration to obtain the first time, where the first duration is a sum of a second duration, a third duration, and a fourth duration, the second duration is a duration for traveling from a preset position to the first travel start position, the third duration is a duration for which a user needs to stay at the preset position, and the fourth duration is a duration for which the user needs to stay at the first travel start position: obtain an alarm list, where the alarm list includes a plurality of times; and display the first card when the terminal device determines that each of the plurality of times is later than the first time: display the first card when the terminal device determines that one time in the plurality of times is earlier than the first time and that a difference between the one time in the plurality of times and the first time is greater than a first threshold: or display the first card when the terminal device determines that one time in the plurality of times is earlier than the first time, that a difference between the one time in the plurality of times and the first time is less than or equal to the first threshold, and that a state of an alarm corresponding to the one time in the plurality of times is an off state.

In a possible implementation, the processing unit is specifically configured to: integrate a software development kit SDK of a map application: obtain the second duration from the software development kit SDK of the map application: calculate the sum of the second duration, the third duration, and the fourth duration to obtain the first duration; and calculate the difference between the first travel start time and the first duration to obtain the first time.

In a possible implementation, the alarm list includes a second time. The processing unit is specifically configured to: obtain a plurality of fifth durations from a service platform when the terminal device determines that the second time is a wake-up alarm time and that an alarm date corresponding to the second time is within a first date period, where the service platform is configured to serve the terminal device, any duration in the plurality of fifth durations is a duration for which the terminal device stayed at the preset position in history after the second time, and the first date period includes a plurality of dates of workdays: cluster the plurality of fifth durations to obtain a plurality of first curves: fit the plurality of first curves into a second curve: when an area ratio of one curve in the plurality of first curves to the second curve is a maximum value, determine a duration corresponding to the one first curve in the plurality of first curves as the third duration; and calculate the sum of the second duration, the third duration, and the fourth duration to obtain the first duration.

In a possible implementation, the processing unit is specifically configured to: obtain, from the service platform, a plurality of durations for which the terminal device stayed at the first travel start position in history: calculate an average duration of the plurality of durations for which the terminal device stayed at the first travel start position in history, to obtain the fourth duration; and calculate the sum of the second duration, the third duration, and the fourth duration to obtain the first duration.

In a possible implementation, the first interface includes a second control. The processing unit is specifically configured to: set the alarm corresponding to the first time when a second operation for the second control is received.

In a possible implementation, the processing unit is further configured to: receive second travel information in a case that the second operation for the second control is not received; and delete the first card when the terminal device determines that a state in the second travel information is a first state and that the second travel information and the first travel information meet a first condition, where the first state is used to indicate travel status, and the first state indicates that the travel status is refunded or the travel status is canceled.

In a possible implementation, the second travel information includes a second travel start position, a second travel start date, a second travel start time, and a second travel identifier, the first travel information includes the first travel start position, the first travel start time, a first travel identifier, and a first travel start date, and that the second travel information and the first travel information meet a first condition includes: the second travel start time is the same as the first travel start time, the second travel identifier is the same as the first travel identifier, the second travel start position is the same as the first travel start position, and the second travel start date is the same as the first travel start date.

In a possible implementation, the processing unit is further configured to: receive second travel information in a case that the second operation for the second control is not received, where the second travel information includes a second travel start time: obtain a third time based on the second travel start time when the terminal device determines that a state in the second travel information is a second state and that the second travel information and the first travel information meet a second condition, where the third time is a suggested alarm time, the second state is used to indicate travel status, and the second state indicates that the travel status is ticket-changed; and update the first time in the first card to the third time.

In a possible implementation, the second travel information further includes a second travel start position, a second travel start date, and a second travel identifier, the first travel information includes the first travel start position, the first travel start time, a first travel identifier, and a first travel start date, and that the second travel information and the first travel information meet a second condition includes: the first travel start date is the same as the second travel start date, the first travel identifier is the same as the second travel identifier, the first travel start position is the same as the second travel start position, and an absolute value of a difference between the second travel start time and the first travel start time is less than or equal to a second threshold.

In a possible implementation, the first travel information includes a first travel start time and a first travel start date. The processing unit is further configured to: obtain electricity usage amounts of the terminal device in a plurality of time segments from a service platform when the first travel start time is within a first time segment, where the service platform is configured to serve the terminal device, and the plurality of time segments include a second time segment: subtract a sixth duration from an initial time of the second time segment when the terminal device determines that an electricity usage amount in the second time segment is less than or equal to a third threshold, to obtain a fourth time; and display the first card when the fourth time is reached on the day before the first travel start date.

In a possible implementation, the processing unit is further configured to: delete the first card when the terminal device determines that the initial time of the second time segment is reached on the day before the first travel start date and that the terminal device has not received, on the first interface, the operation of confirming the alarm setting corresponding to the first time.

In a possible implementation, the processing unit is further configured to: receive third travel information: display a second card when a state in the third travel information is a first state and that the third travel information and the first travel information meet a first condition, where the second card is used to suggest deleting the alarm setting corresponding to the first time, the first state is used to indicate travel status, and the first state indicates that the travel status is refunded or the travel status is canceled: receive a third operation for the second card: display a second interface in response to the third operation, where the second interface includes a third control: receive a fourth operation for the third control; and delete the alarm corresponding to the first time in response to the fourth operation.

In a possible implementation, the first travel information includes a first travel start position, a first travel start time, a first travel identifier, and a first travel start date, the third travel information includes a third travel start position, a third travel start date, a third travel start time, and a third travel identifier, and that the third travel information and the first travel information meet a first condition includes: the first travel start time is the same as the third travel start time, the third travel identifier is the same as the first travel identifier, the first travel start position is the same as the third travel start position, and the third travel start date is the same as the first travel start date.

According to a third aspect, an embodiment of this application provides an alarm setting apparatus. The apparatus may include a processor and a memory. The memory is configured to store code instructions. The processor is configured to execute the code instructions, to perform the method described in the first aspect or any one of the possible implementations of the first aspect.

According to a fourth aspect, an embodiment of this application provides an alarm setting system. The system may include the apparatus described in the second aspect and the possible implementations of the second aspect.

According to a fifth aspect, an embodiment of this application provides a computer-readable storage medium. The computer-readable storage medium stores a computer program or instructions. When the computer program or instructions are run on a computer, the computer is enabled to perform the method described in the first aspect or any one of the possible implementations of the first aspect.

According to a sixth aspect, an embodiment of this application provides a computer program product including a computer program. When the computer program is run on a computer, the computer is enabled to perform the method described in the first aspect or any one of the possible implementations of the first aspect.

According to a seventh aspect, this application provides a chip or a chip system. The chip or chip system includes at least one processor and a communication interface. The communication interface and the at least one processor are interconnected by using a line. The at least one processor is configured to run a computer program or instructions, to perform the method described in the first aspect or any one of the possible implementations of the first aspect. The communication interface in the chip may be an input/output interface, a pin, a circuit, or the like.

In a possible implementation, the chip or the chip system described above in this application further includes at least one memory. The at least one memory stores instructions. The memory may be a storage unit in the chip, for example, a register or a cache, or may be a storage unit (for example, a read-only memory or a random access memory) of the chip.

It should be understood that for technical solutions of the second aspect to the seventh aspect of this application correspond to those of the first aspect of this application.

Beneficial effects achieved in each aspect and feasible implementations thereof are similar. Details are not described again.

BRIEF DESCRIPTION OF DRAWINGS

FIG. 5 is a schematic flowchart of an alarm setting method according to an embodiment of this application:

DESCRIPTION OF EMBODIMENTS

For ease of clearly describing the technical solutions in the embodiments of this application, in the embodiments of this application, words "first", "second", and the like are used to distinguish between same or similar items with basically the same functions and effects. For example, the first chip and the second chip are merely for the purpose of distinguishing between different chips, rather than limiting a sequential order. Those skilled in the art may understand that words "first", "second", and the like are not intended to limit a quantity and an execution order, and are also unnecessarily different.

It should be noted that the word "example", "for example", or the like in the embodiments of this application is used to indicate an example, an illustration, or a description. Any embodiment or design scheme described as "example" or "for example" in this application should not be construed as being preferable or advantageous than other embodiments or design schemes. Exactly, use of the word such as "example" or "for example" is intended to present a concept in a specific manner.

In this embodiment of this application, the term "at least one" refers to one or more, and the term "a plurality of" refers to two or more. The term "and/or" is used to describe an association relationship between associated objects, and indicates that three relationships may exist. For example, A and/or B may represent the following cases: Only A exists, both A and B exist, and only B exists, where each of A and B may be singular or plural. The character "/" generally indicates that the associated objects are in an "or" relationship. The term "at least one of the following items/( )" or a similar expression refers to any combination of these items, including any combination of single items/( ) or plural items/( ) For example, at least one of a, b, or c may indicate: a, b, c, a and b, a and c, b and c, or a, b, and c, where a, b, and c may be singular or plural.

With the increasing development of terminal technologies, a clock on a terminal device provides convenience for travel of a user, for example, the clock can remind the user of a departure time.

Generally, when the terminal device obtains travel information of the user, the terminal device may remind, based on the travel information, the user of a time set in the clock, and the user can set the time in the clock, so that when the time set in the clock is reached, the terminal device may remind the user to depart.

Figures 1A, 1B:
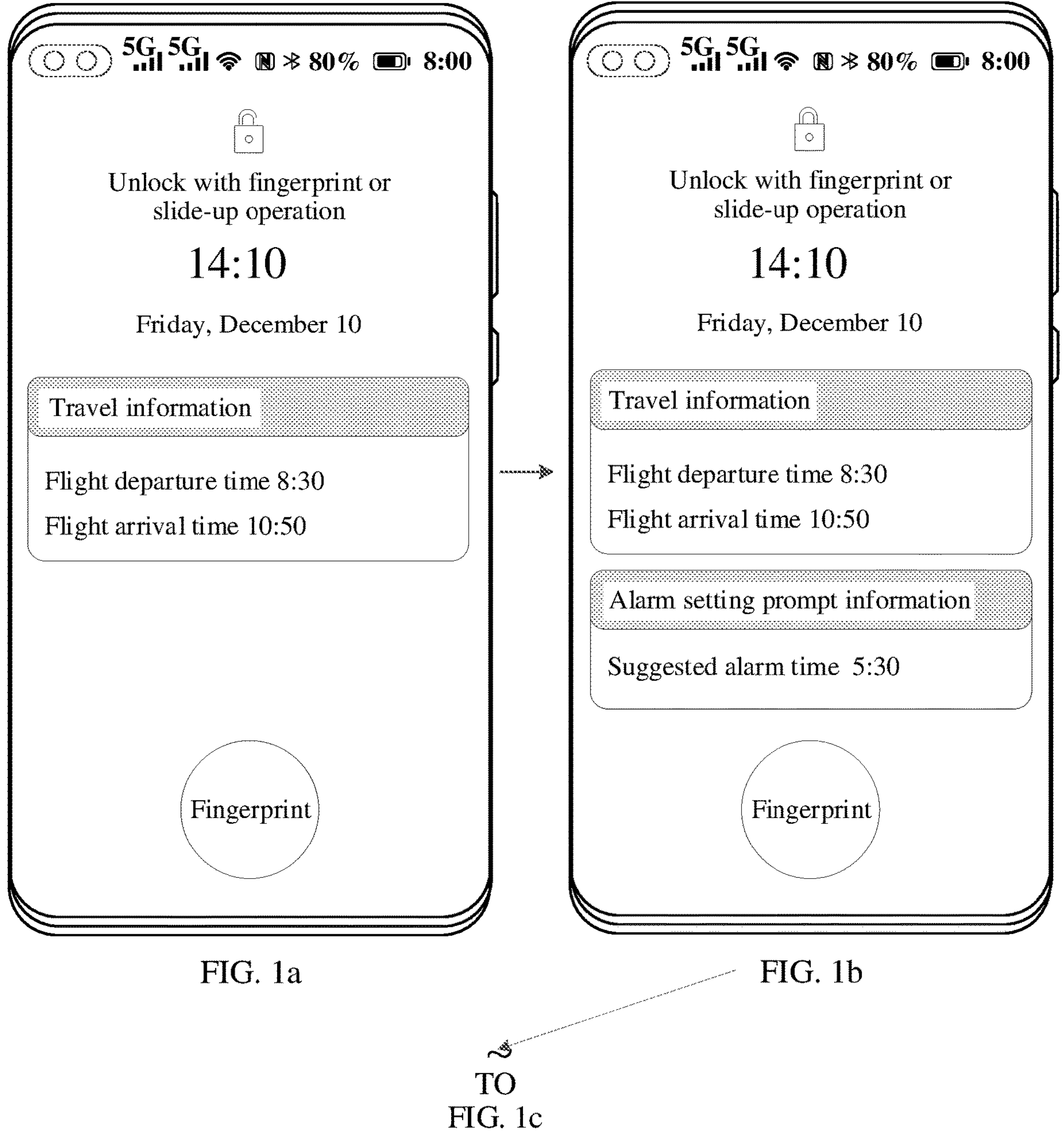
FIGS. 1*a*, 1*b*, 1*c*, 1*d*, 1*e*, and 1*f* illustrate a schematic diagram of an application scenario according to an embodiment of this application.

For example, FIG. 1 is a schematic diagram of a scenario according to an embodiment of this application. When a terminal device obtains travel information, the terminal device may display the travel information on the interface shown in FIG. 1*a*. For example, when the travel information is flight information, the travel information may include a flight departure time, a flight arrival time, and the like. At a next moment, when the terminal device reminds a user that an alarm setting is required, the terminal device may display the interface shown in FIG. 1*b*. The interface includes travel information and alarm setting prompt information. The alarm setting prompt information is used to suggest the user for setting an alarm time. For example, a suggested alarm time may be 5:30.

When the user needs to set an alarm, the user may perform an unlocking process on the interface shown in FIG. 1*b*. When the terminal device receives a trigger for the unlocking process, the terminal device may display the interface shown in FIG. 1*c*. The interface includes one or more of the following application controls, for example, a file management control, an email control, a health control, and an AI life control. The interface further includes a clock control 101. When the user triggers the clock control 101 by performing an operation such as clicking or touching, the terminal device receives a trigger for the clock control 101, and the terminal device may display the interface shown in FIG. 1*d*.

Figures 1C, 1D:
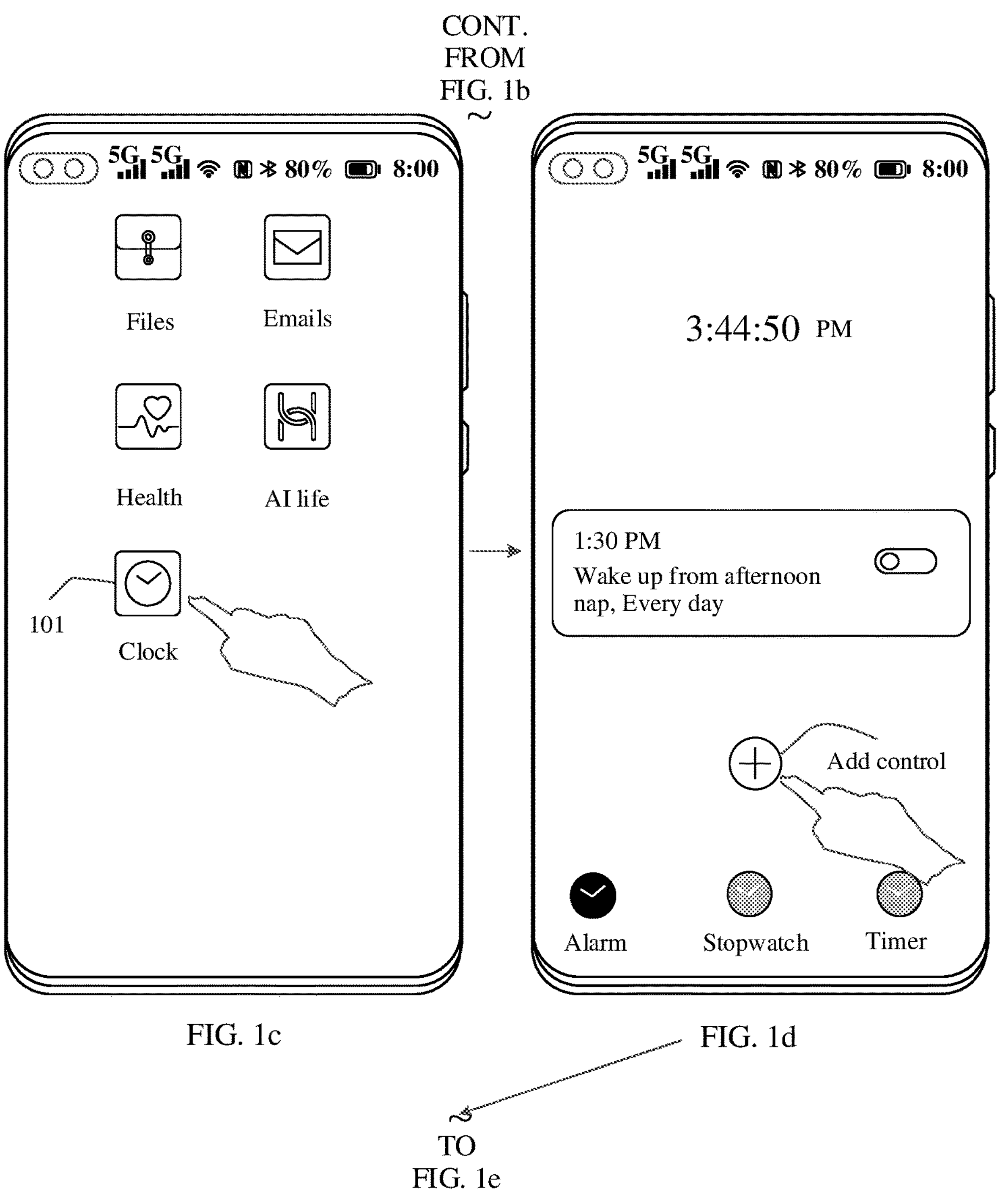
Figures 1E, 1F:
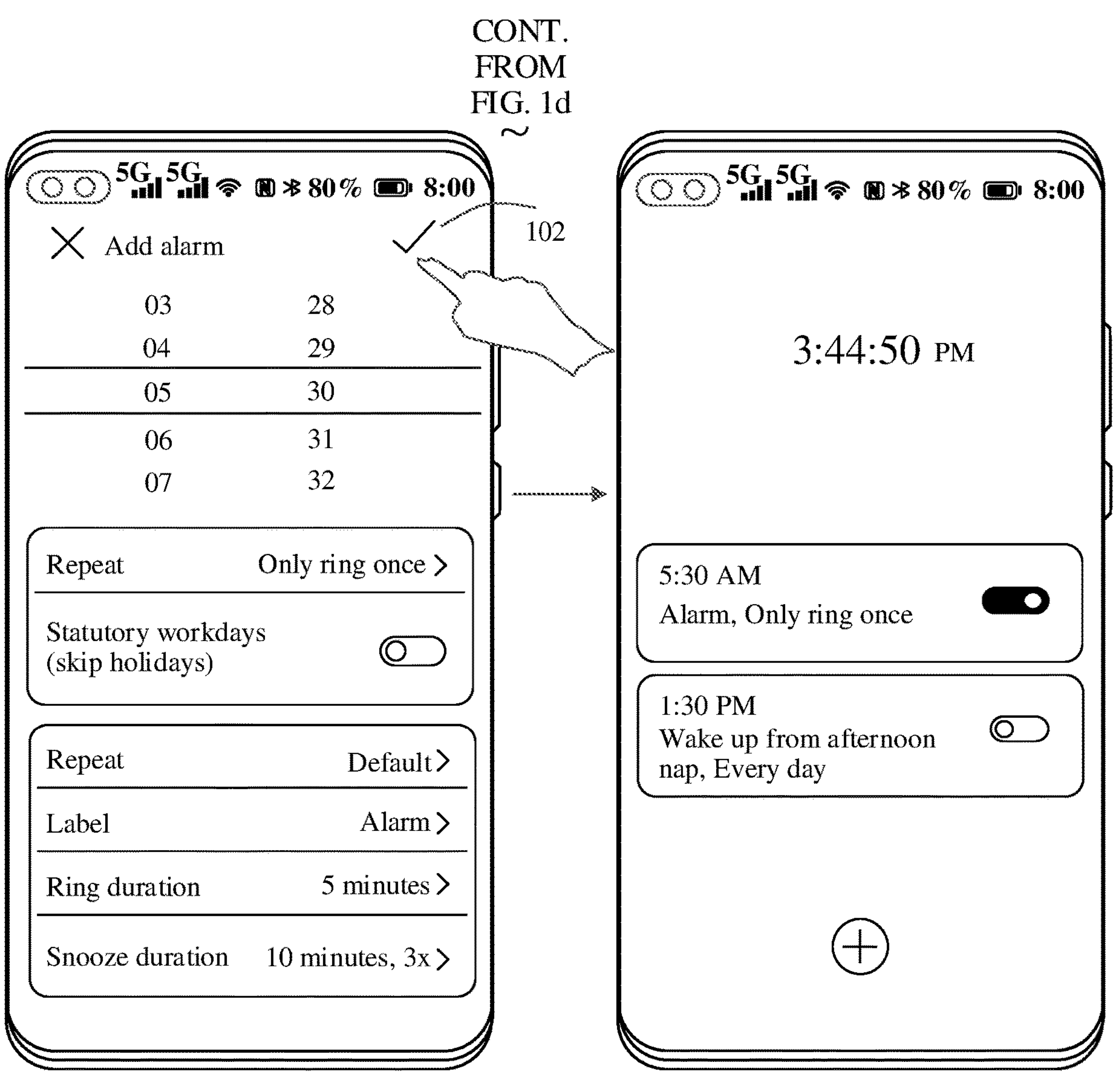

In the interface shown in FIG. 1*d*, when the user triggers an add control by performing an operation such as clicking or touching, the terminal device receives a trigger for the add control, and the terminal device may display the interface shown in FIG. 1*e*. The interface is a newly added alarm interface.

In the interface shown in FIG. 1*e*, when the user selects an alarm time and sets options related to the alarm time, the user may trigger a confirm control 102 by performing an operation such as clicking or touching. When the terminal device receives a trigger for the confirm control 102, the terminal device may display the interface shown in FIG. 1*f*.

Different from the interface shown in FIG. 1*d*, the interface shown in FIG. 1*f* further displays an alarm time that is just set by the user. In this way, when the alarm time set above is reached, the terminal device may remind the user to depart.

However, an operation process of the foregoing alarm setting manner is cumbersome. For example, with reference to FIG. 1*a* to FIG. 1*f*, in interfaces shown in FIG. 1*d* to FIG. 1*f*, the user needs to manually select an alarm time on a clock interface based on an alarm setting time reminded by the terminal device.

In view of this, embodiments of this application provide an alarm setting method and apparatus. The terminal device may display a first card when the terminal device receives first travel information, where the first card includes the first travel information and alarm setting information, the alarm setting information includes a first control and a first time, and the first time is a suggested alarm time. The terminal device may display a first interface in response to a first operation for the first control, where the first interface is an alarm setting interface on which the first time has been selected. The terminal device may set an alarm corresponding to the first time when an operation of confirming an alarm setting corresponding to the first time is received on the first interface. In this way, when the user sees the suggested alarm time on the first card, the user does not need to manually open the alarm setting interface in the clock. The user may open the alarm setting interface by using the first control in the first card. In addition, the terminal device has already selected the first time in the alarm setting interface, so that the user does not need to manually select the first time, either. The method has a simple operation process, thereby improving user experience.

It may be understood that the method in this embodiment of this application can be applied to scenarios such as a flight travel, a train travel, or a ship travel. The method provided in this embodiment of this application can provide the user with a personalized alarm time, so that the user will not delay the travel.

Figure 2:
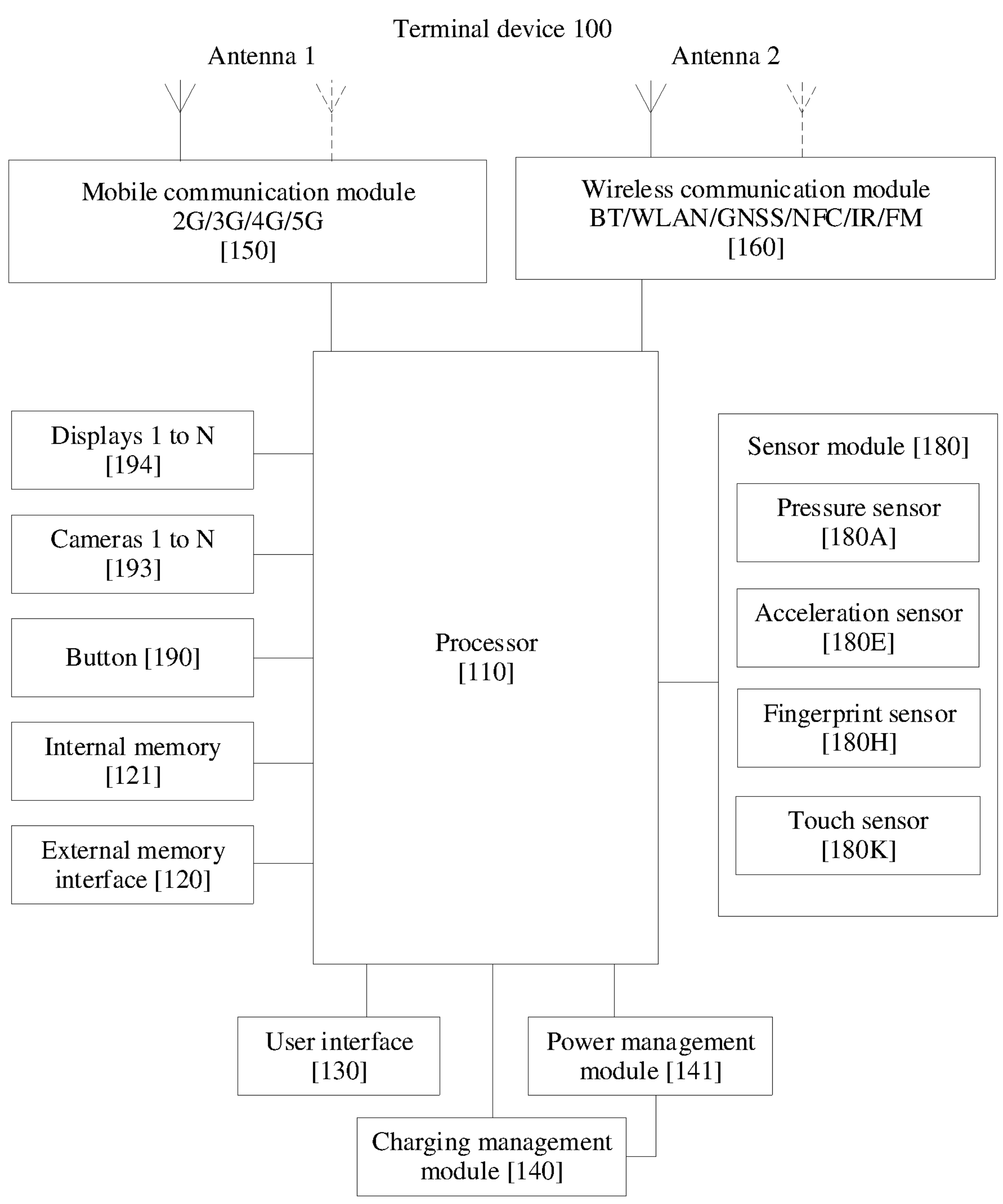
FIG. 2 is a schematic diagram of a hardware structure of a terminal device according to an embodiment of this application.

The method in this embodiment of this application may be applied to a terminal device. For example, FIG. 2 is a schematic diagram of a hardware structure of a terminal device according to an embodiment of this application. As shown in FIG. 2, the terminal device 100 may include a processor 110, an external memory interface 120, an internal memory 121, a power management module 141, an antenna 1, an antenna 2, a mobile communication module 150, a wireless communication module 160, a sensor module 180, a button 190, a camera 193, a display 194, a user interface 130, a charging management module 140, and the like. The sensor module 180 may include: a pressure sensor 180A, an acceleration sensor 180E, a fingerprint sensor 180H, a touch sensor 180K, and the like.

It should be noted that the structure illustrated in this embodiment of this application does not constitute a specific limitation on the terminal device 100. It may be understood that the terminal device 100 may include more or fewer components than those shown in the figure, or some components may be combined or split, or there may be a different component arrangement. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The processor 110 may be further provided with a memory, configured to store instructions and data. In some embodiments, the memory in the processor 110 may be a cache. The memory may store instructions or data that has just been used or used repeatedly by the processor 110.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal serial bus (universal serial bus, USB) interface, and/or the like.

The user interface 130 is used to transmit data between the terminal device 100 and a peripheral device, and may also be used to connect to a headset, to play audio by using the headset. The user interface 130 may also be used to connect to another device, for example, an augmented reality (augmented reality, AR) device or the like.

The power management module 141 receives an input from the charging management module 140. The power management module 141 supplies power to the processor 110, the internal memory 121, the display 194, the camera 193, the wireless communication module 160, and the like.

A wireless communication function of the terminal device 100 may be implemented by using the antenna 1, the antenna 2, the mobile communication module 150, the wireless communication module 160, and the like. The antenna 1 and the antenna 2 are configured to transmit and receive electromagnetic wave signals. Each antenna in the terminal device 100 may be configured to cover one or more communication bands. Alternatively, different antennas may be multiplexed to improve antenna utilization. For example, the antenna 1 may be multiplexed as a diversity antenna in a wireless local area network.

The mobile communication module 150 may provide solutions for wireless communications such as 2G, 3G, 4G, and 5G which are applied to the terminal device 100. The wireless communication module 160 may provide wireless communication solutions that are applied to the terminal device 100 and that include a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like.

In some embodiments, the antenna 1 of the terminal device 100 is coupled to the mobile communication module 150, and the antenna 2 is coupled to the wireless communication module 160, so that the terminal device 100 may communicate with a network and another device through a wireless communication technology. The wireless communication technology may include global system for mobile communications (global system for mobile communications, GSM), general packet radio service (general packet radio service, GPRS), code division multiple access (code division multiple access, CDMA), long term evolution (long term evolution, LTE), BT, GNSS, WLAN, NFC, FM, IR, and/or the like.

The terminal device 100 implements a display function by using the display 194. The display 194 is configured to display an image, a video, or the like. The display 194 includes a display panel. In some embodiments, the terminal device 100 may include one or N displays 194, where N is a positive integer greater than 1.

In this embodiment of this application, the terminal device may display, through the display, a control and an option that are used for setting an alarm. For example, the control may be a first control, a second control, or a third control. The option may be ring duration, snooze duration, or the like. The user may set a suggested alarm time in a clock through the option and the control.

The terminal device 100 may implement an image shooting function through the camera 193. The camera 193 is configured to capture a static image or a video.

The external memory interface 120 may be configured to connect to an external storage card, thereby extending a storage capability of the terminal device 100. The external storage card communicates with the processor 110 through the external memory interface 120, to implement a data storage function.

The internal memory 121 may be configured to store computer executable program code that includes an instruction. The internal memory 121 may include a program storage area and a data storage area. The program storage area may store an operating system, an application program required by at least one function (for example, a sound playing function or an image playing function), and the like.

The pressure sensor 180A is configured to sense a pressure signal, and can convert the pressure signal into an electrical signal. In some embodiments, the pressure sensor 180A may be disposed on the display 194.

The acceleration sensor 180E may detect accelerations in all directions (generally, three axes) of the terminal device 100. The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The touch sensor 180K, also referred to as "touch component", may be disposed on the display 194. The touch sensor 180K and the display 194 constitute a touchscreen, which is also referred to as a "touch screen". The touch sensor 180K is configured to detect a touch operation performed on or near the touch sensor.

In this embodiment of this application, the user may trigger the first control, the second control, or the third control through the touchscreen, so that the terminal device receives the operation for the first control, the second control, or the third control. Then, in response to the operation, the terminal device can perform a corresponding step.

Figure 3:
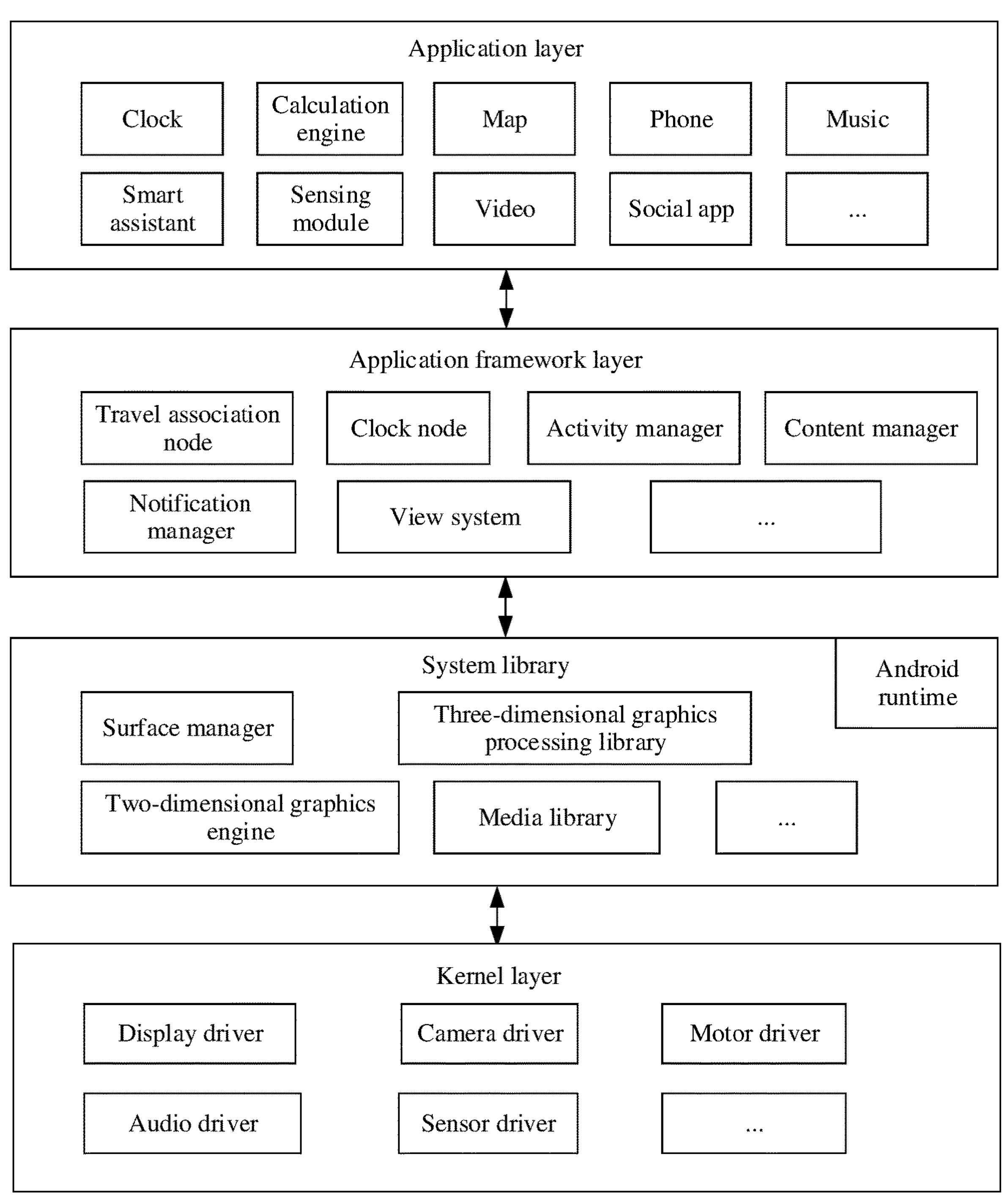
FIG. 3 is a schematic diagram of a software structure of a terminal device according to an embodiment of this application.

For example, FIG. 3 is a schematic diagram of a software structure of a terminal device according to an embodiment of this application. As shown in FIG. 3, a layered architecture divides the software structure of the terminal device 100 into several layers, and each layer has a clear role and responsibility. The layers communicate with each other through a software interface.

In some embodiments, an Android system may be divided into five layers: an application (applications) layer, an application framework (application framework) layer, Android runtime (Android runtime), a system library, and a kernel (kernel) layer.

In a possible manner, the application layer may include a series of application packages. The application layer invokes an application programming interface (application programming interface, API) provided by the application framework layer, to run an application. For example, as shown in FIG. 3, the application packages may include applications such as Map, Phone, Music, Video, or Social app.

In this embodiment of this application, the application layer may further include a clock, a calculation engine, a smart assistant, and a sensing module. The sensing module is configured to sense whether the terminal device has received travel information. The calculation engine is used to calculate a suggested alarm time. For example, the calculation engine is used to calculate a first time or the like. The smart assistant is used to display a card for the user. The smart assistant may be a YOYO suggestion. In this way, when the user sees a card displayed based on the YOYO suggestion, the user may perform a corresponding operation.

Figure 4:
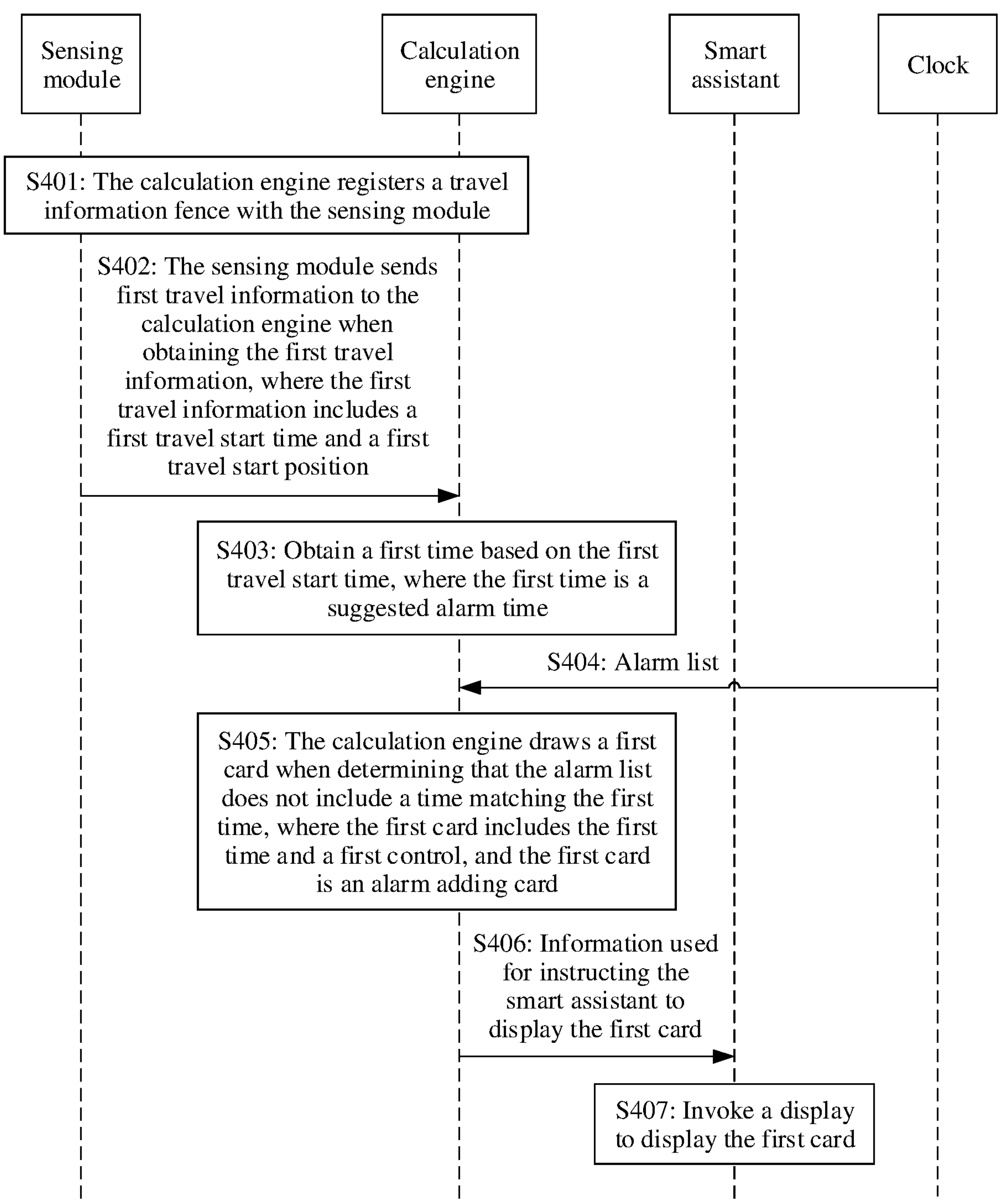
FIG. 4 is a schematic flowchart of an alarm setting method according to an embodiment of this application.

In a possible manner, the application framework layer provides an API and a programming framework for applications on the application layer. For example, as shown in FIG. 4, the application framework layer may include a content manager, a view system, an activity manager, a notification manager, and the like. The application framework layer further includes some predefined functions and the like.

The content manager is configured to store and obtain data, and make the data accessible to an application. For example, the data may include browse history and favorites, made and received calls, a video, an image, audio, a phone book, and the like. The view system includes visual controls, such as a control for displaying a text and a control for displaying an image. The view system may be configured to construct an application. A display interface may include one or more views. For example, a display interface including an SMS notification icon may include a view displaying a text and a view displaying an image.

The notification manager enables an application to display notification information in a status bar, and may be configured to convey a notification-type message. The displayed information may automatically disappear after a short stay, without user interaction. For example, the notification manager is configured to notify a user that downloading is completed, provide a message notification, and the like. The notification manager may alternatively provide a notification, such as a notification of an application running in the background, appearing in a top status bar of the system in a form of a chart or scrollbar text, or may provide a notification appearing in a form of a dialog window on the screen. For example, text information is displayed in the status bar, a prompt sound is played, the terminal device 100 vibrates, or an indicator light blinks. The activity manager is configured to manage a life cycle of each application and a navigation backoff function, and is responsible for creating a main thread of the Android system and maintaining the life cycle of each application.

In this embodiment of this application, the application framework layer may further include a travel association node and a clock node. The calculation engine may register a travel information fence with the sensing module by using the travel association node. The calculation engine may obtain an alarm list from the clock by using the clock node, to determine whether the alarm list includes a suggested alarm time. The application framework layer may further include a display synthesis system. A step related to the display synthesis system will be described subsequently. Details are not described herein. The display synthesis system is not shown in this figure.

In a possible manner, the Android runtime is responsible for scheduling and managing the Android system, and may include a kernel library and a virtual machine. The kernel library includes two parts: a functional function that needs to be invoked in the Java language, and a kernel library of Android. The virtual machine is configured to perform functions, such as object security and exception management, life cycle management, stack management, thread management, and garbage collection.

It should be noted that the application layer and the application framework layer run in a virtual machine. The virtual machine executes Java files at the application layer and the application framework layer as binary files.

In this embodiment of this application, the terminal device may further include a hardware abstraction layer (hardware abstraction layer, HAL). The HAL may include a hardware synthesis processor. A step related to the hardware synthesis processor will be described subsequently. Details are not described herein. The HAL is not shown in this figure.

In a possible manner, the system library may include a plurality of functional modules, for example, a surface manager (surface manager), a media library (Media Libraries), a three-dimensional graphics processing library (for example, OpenGL ES), and a two-dimensional graphics engine.

The surface manager is configured to manage a display subsystem, and provides fusion of two-dimensional and three-dimensional layers for a plurality of applications. The three-dimensional graphics processing library is configured to implement three-dimensional graphics drawing, image rendering, synthesis, layer processing, and the like. The two-dimensional graphics engine is a drawing engine for two-dimensional drawing. The media library supports playback and recording in a plurality of common video formats, audio, a still image file, and the like. The media library may support a plurality of audio and video coding formats, for example, MPEG4, H.264, MP3, AAC, AMR, JPG, and PNG.

In a possible way, the kernel layer is a layer between hardware and software. The kernel layer includes at least a display driver, an audio driver, a camera driver, a sensor driver, a motor driver, and the like. This is not limited in this embodiment of this application.

In this embodiment of this application, the terminal device may further include a hardware layer. The hardware layer may include a display subsystem and a display. A step related to the display subsystem and the display will be described subsequently. Details are not described herein. The hardware layer is not shown in this figure.

With reference to the foregoing content, for example, FIG. 4 is a schematic flowchart of an alarm setting method according to an embodiment of this application. As shown in FIG. 4, the following steps may be included.

S401: A calculation engine registers a travel information fence with a sensing module.

In this embodiment of this application, with reference to FIG. 3, the calculation engine may register the travel information fence with the sensing module by using a travel association node, thereby instructing the sensing module to monitor travel information, and enabling the sensing module to send the travel information to the calculation engine when monitoring a notification status of the travel information.

S402: The sensing module sends first travel information to the calculation engine when the sensing module obtains the first travel information.

In this embodiment of this application, with reference to FIG. 3, the calculation engine may obtain the first travel information from the sensing module by using a travel association node. The first travel information may include a first travel start position and a first travel start time. For example, when the first travel information is flight information, the first travel start time is a flight departure time, and the first travel start position is an airport position. Specific content of the first travel information may be set based on actual application scenarios. This is not limited in this embodiment of this application.

S403: The calculation engine obtains a first time based on a first travel start time.

In this embodiment of this application, the first travel information may further include a first travel start date. The first time is a time suggested by a terminal device for a user to set in a clock, or it may be understood that the first time is a suggested alarm time. The first time is a time obtained by subtracting a first duration from the first travel start time. The first duration is a sum of a second duration, a third duration, and a fourth duration.

In this embodiment of this application, the second duration may be understood as a duration for traveling from a preset position to the first travel start position. A possible implementation in which the calculation engine obtains the second duration is: the sensing module integrates a software development kit (software development kit, SDK) of a map application: the sensing module obtains, from the software development kit SDK of the map application, the duration for traveling from the preset position to the first travel start position; the sensing module sends, to the calculation engine, the duration for traveling from the preset position to the first travel start position; and the calculation engine obtains the second duration.

The preset position is used to indicate a position where the user sets off. For example, the preset position may be a position of the user's home. The sensing module may send, to the calculation engine through a future path planning interface, the duration for traveling from the preset position to the first travel start position.

In this embodiment of this application, the third duration is a duration for which the user needs to stay at the preset position. A possible implementation in which the calculation engine obtains the third duration is: the calculation engine obtains an alarm list from the clock, where the alarm list includes a second time: when the calculation engine determines that the second time is a wake-up alarm time and that an alarm date corresponding to the second time is within a first date period, the calculation engine obtains, from a service platform, a plurality of durations for which the terminal device stayed at the preset position in history after the second time: the calculation engine clusters the plurality of durations for which the terminal device stayed at the preset position in history, to obtain a plurality of first curves: the calculation engine fits the plurality of first curves into a second curve; and when an area ratio of one curve in the plurality of first curves to the second curve is a maximum value, the calculation engine determines a duration corresponding to the one first curve in the plurality of first curves as the third duration, where the plurality of durations for which the terminal device stayed at the preset position in history may be understood as a plurality of fifth durations, and any duration in the plurality of fifth durations is a duration for which the terminal device stayed at the preset position in history after the second time.

The first date period includes a plurality of dates of workdays. When the preset position is a home position, the plurality of durations for which the terminal device stayed at the preset position in history after the second time may be understood as a plurality of historical durations spent by the user from getting up to leaving home on dates of workdays; or the plurality of durations for which the terminal device stayed at the preset position in history after the second time may be understood as a plurality of historical durations for which the user historically stayed at home after getting up on dates of workdays.

It may be understood that, the calculation engine may alternatively calculate an average duration of the plurality of durations for which the terminal device stayed at the preset position in history, to obtain the third duration. An implementation in which the calculation engine obtains the third duration may also be set based on actual application scenarios. This is not limited in this embodiment of this application.

In this embodiment of this application, the fourth duration is a duration for which the terminal device needs to stay at the first travel start position. A possible implementation in which the calculation engine obtains the fourth duration is: the calculation engine obtains, from the service platform, a plurality of durations for which the terminal device stayed at the first travel start position in history; and the calculation engine calculates an average duration of the plurality of durations, to obtain the fourth duration. It may be understood that, the fourth duration may be a duration for waiting for a flight, a duration for waiting for a bus, or the like.

With reference to the content described in S403, as an example, when the first travel start time is 8:30, the second duration is 1.5 hours, the third duration is 30 minutes, and the fourth duration is 1 hour, the first duration is 3 hours. Therefore, the first time is 5:30, that is, the time reminded by the terminal device to set in the clock is 5:30.

S404: The calculation engine obtains an alarm list from a clock.

In this embodiment of this application, the calculation engine obtains the alarm list from the clock through an alarm list query interface. Alternatively, with reference to FIG. 3, the calculation engine may obtain the alarm list from the clock by using the clock node.

S405: The calculation engine draws a first card when the calculation engine determines that the alarm list does not include a time matching the first time.

In this embodiment of this application, the first card is an alarm adding card; and the first card includes the first time and a first control. A possible implementation in which the calculation engine determines that the alarm list does not include a time matching the first time is: when each of the plurality of times in the alarm list is later than the first time, the calculation engine determines that the alarm list does not include a time matching the first time: or when one time in the plurality of times in the alarm list is earlier than the first time and that a difference between one time in the plurality of times and the first time is greater than a first threshold, the calculation engine determines that the alarm list does not include a time matching the first time: or when one time in the plurality of times in the alarm list is earlier than the first time, that a difference between one time in the plurality of times and the first time is less than or equal to the first threshold, and that a state of an alarm corresponding to one time in the plurality of times is an off state, the calculation engine determines that the alarm list does not include a time matching the first time.

It may be understood that, an implementation in which the calculation engine determines that the alarm list does not include a time matching the first time may also be set based on actual application scenarios. This is not limited in this embodiment of this application.

It may be understood that, a possible implementation in which the calculation engine determines that the alarm list includes a time matching the first time is: when one time in the plurality of times in the alarm list is earlier than the first time, that a difference between one time in the plurality of times and the first time is less than or equal to the first threshold, and that a state of an alarm corresponding to one time in the plurality of times is an on state, the calculation engine may determine that the time matching the first time in the alarm list is one time in the plurality of times. Because one time in the plurality of times matches the first time determined by the calculation engine, the terminal device may remind the user based on the one time in the plurality of times. In this way, the calculation engine does not need to draw the first card.

It may be understood that, when the calculation engine draws the first card, the calculation engine may record a creation status of the first card as a created state, for the calculation engine to subsequently modify or delete an alarm corresponding to the first card.

S406: The calculation engine sends, to a smart assistant, information used for instructing the smart assistant to display the first card.

S407: The smart assistant invokes a display to display the first card.

In this embodiment of this application, the first card includes first travel information and alarm setting information. The alarm setting information includes the first control and the first time. The first control is an alarm adding control. The first time is the suggested alarm time. The smart assistant may display the first card on a main interface, a lock screen, a leftmost home screen, or another interface. The smart assistant may be understood as a YOYO suggestion.

It may be understood that, when the calculation engine draws the first card, the calculation engine may also determine an alarm name corresponding to the first time. The first travel information may include a first travel identifier. The alarm name corresponding to the first time may be a name composed of a type of the first travel information and the first travel identifier. For example, when the first travel information is flight information, the type of the first travel information is flight, and the first travel identifier is a flight number. For example, the first travel identifier may be MU5129. In this case, the alarm name corresponding to the first time may be flight MU5129.

With reference to the content described in FIG. 2, it may be understood that, the information used for instructing the smart assistant to display the first card may include display data of the first card. In this way, when the smart assistant receives the information used for instructing the smart assistant to display the first card, the smart assistant may send the display data of the first card to a display synthesis system, so that the display synthesis system is enabled to perform layer processing on the display data of the first card, and send layer-processed data to a hardware synthesis processor. The hardware synthesis processor performs layer overlapping on the layer-processed data. The display subsystem may obtain layer-overlapped data from the hardware synthesis processor, and send the layer-overlapped data to the display. After the display obtains backlight provided by a display driver, the display may display the first card based on the layer-overlapped data and the backlight provided by the display driver, thereby implementing a process in which the smart assistant invokes the display to display the first card. The layer processing may be understood as a process of processing each layer. The layer processing may include processing such as layer rendering. The layer overlapping may be understood as synthesizing a plurality of processed layers into single-image data.

It may be understood that, an implementation in which the smart assistant displays a card or an interface is described subsequently, and reference may be made to the above-described implementation in which the smart assistant invokes the display to display the first card.

It may be understood that, in S403, when the calculation engine detects that a difference between a first position of the terminal device and the preset position is greater than a second threshold and that a duration for which the terminal device stays at the first position is greater than a third threshold, the calculation engine obtains, from the sensing module, a duration for traveling from the first position to a travel start position; and when the duration for traveling from the first position to the travel start position is greater than a duration for traveling from the preset position to the travel start position, the calculation engine updates the second duration to the duration for traveling from the first position to the travel start position, so that the calculation engine updates the first card based on an updated second duration.

With reference to the content shown in FIG. 4, for example, FIG. 5 is a schematic flowchart of an alarm setting method according to an embodiment of this application. The method in this embodiment of this application may be applied after S407. As shown in FIG. 5, the following steps may be included.

S501: A terminal device displays a first interface when receiving, on the first card, a first operation for a first control.

In this embodiment of this application, the terminal device may obtain the alarm name corresponding to the first time from the calculation engine by using the smart assistant. In this way, the smart assistant may invoke or pull up an interface for an alarm adding interface or an alarm editing interface, and transmit the first time in the first card and the alarm name corresponding to the first time, so that when the terminal device displays the first interface, the terminal device has selected the first time, where the first interface includes a second control, and the second control is a confirm control.

That the terminal device displays a first interface when receiving, on the first card, a first operation for a first control may be understood as: the terminal device receives the first operation for the first control, and the terminal device displays the first interface in response to the first operation.

S502: The terminal device adds, in the clock, an alarm corresponding to the first time when receiving a second operation for a second control.

In this embodiment of this application, that the terminal device adds, in the clock, an alarm corresponding to the first time may be understood as: the terminal device sets the alarm corresponding to the first time. With reference to the content described in S501 and S502, for example, FIG. 6 is a schematic diagram of an interface for displaying an alarm corresponding to a first time by a terminal device according to an embodiment of this application. This embodiment of this application is illustrated by using the following example: The smart assistant displays the first card in the main interface, where the first time in the first card is 5:30, the alarm name corresponding to the first time is flight A, and "A" may be used to indicate the first travel identifier.

Figure 6A:
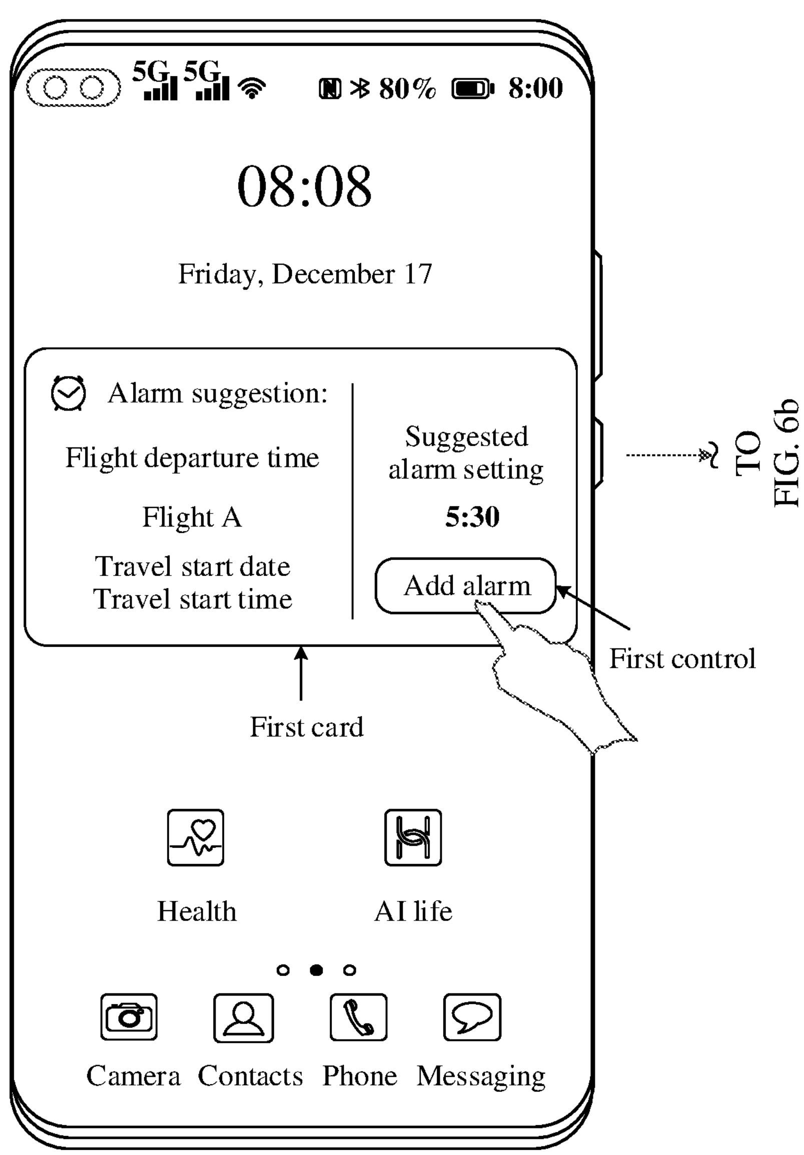
FIGS. 6*a*, 6*b*, and 6*c* illustrate a schematic diagram of an interface for displaying an alarm corresponding to a first time by a terminal device according to an embodiment of this application.

When the smart assistant invokes the display, the terminal device may display, by using the smart assistant, the interface shown in FIG. 6*a*. The interface includes the first travel information and the alarm setting information. For example, referring to the interface shown in FIG. 6*a*, the first travel information is: a flight departure time, a flight A, a travel start date, and a travel start time; and the alarm setting information is: 5:30 and an alarm adding control, where the alarm adding control is the first control. When the user triggers the first control by performing an operation such as clicking or touching, the terminal device receives a trigger for the first control performed by the user, and the terminal device may display the interface shown in FIG. 6*b*. This interface may be referred to as the first interface. In this interface, the terminal device has selected 5:30, and the terminal device has set the alarm name. For example, the alarm name set by the terminal device is flight A. In this way, when the user triggers the second control by performing an operation such as clicking or touching, the terminal device receives a trigger for the second control performed by the user, and the terminal device may display the interface shown in FIG. 6*c*. In this interface, the terminal device adds, to the clock, an alarm time corresponding to 5:30. The operation by which the user triggers the first control via clicking or touching may be referred to as the first operation. The operation by which the user triggers the second control via clicking or touching may be referred to as the second operation.

Figure 6B:
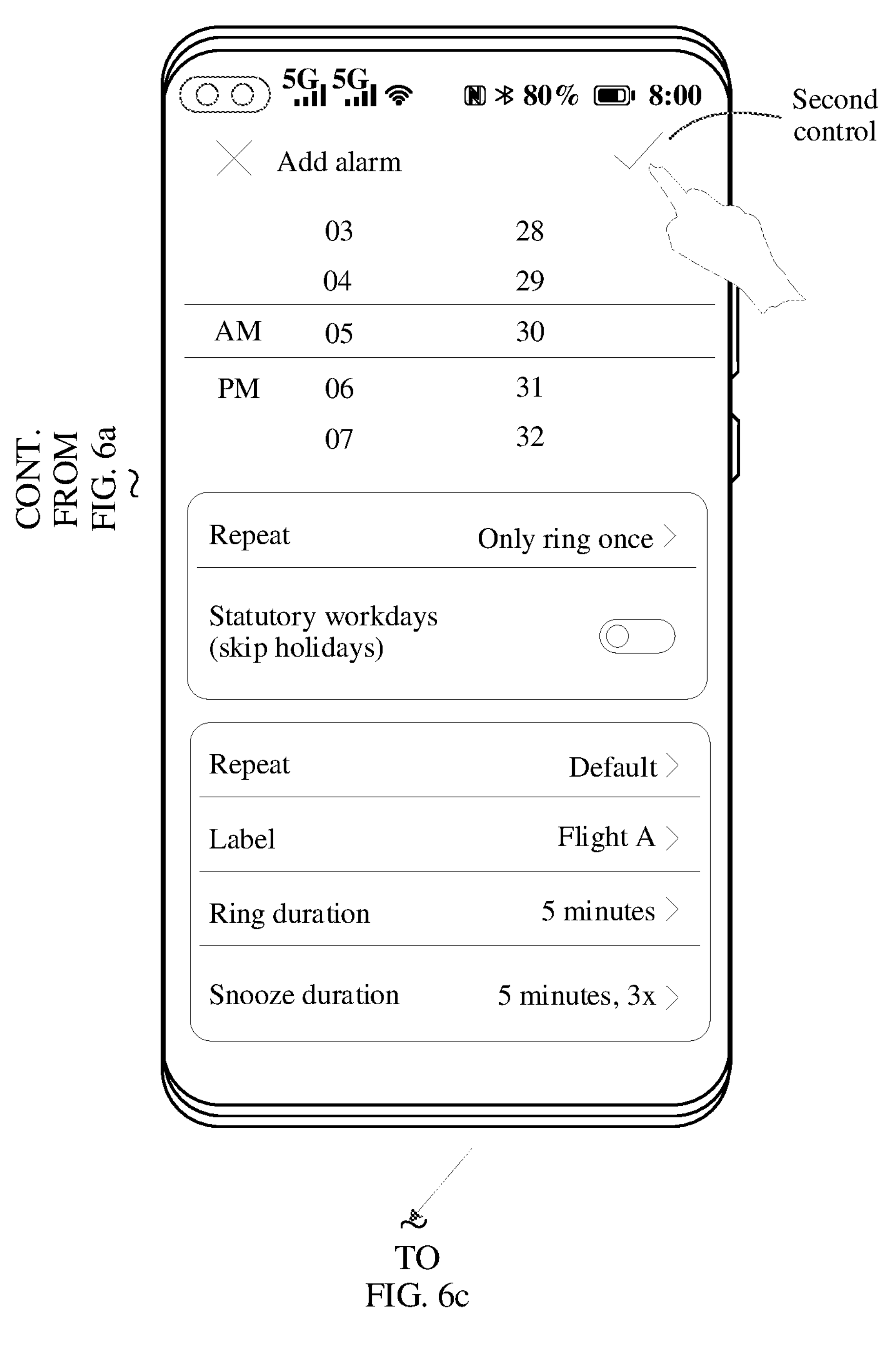
Figure 6C:
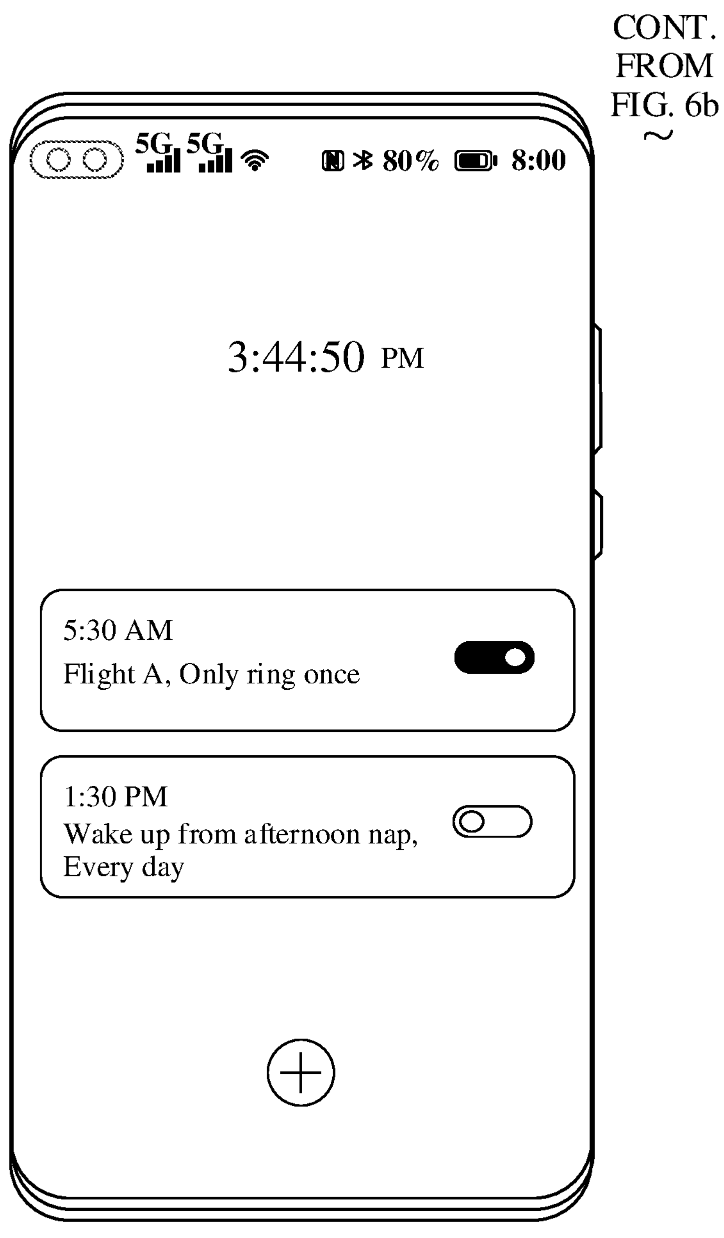

It may be understood that, compared with the interfaces shown in FIG. 1, the interfaces shown in FIG. 6 simplify operation steps by which the user sets an alarm time. For example, in the interface shown in FIG. 6*b*, the terminal device has selected 5:30, and the terminal device has set the alarm name, so that the user does not need to perform any manual operation, but performs a convenient and flexible operation. This improves user experience. In addition, the first time to which the terminal device reminds the user to set in the clock is related to the user's behavioral habit. Compared with a fixed time reminded by the terminal device, this time better conforms to the user's preference. Moreover, in the interface shown in FIG. 6*b*, the alarm name set by the terminal device is flight A. In this way, the user can be further reminded when opening the clock and seeing the time, so that user experience is improved.

It may be understood that, in the interface shown in FIG. 6*b*, the user may reselect options related to the first time according to his/her own demand, or set the first time based on default options. This is not limited in this embodiment of this application.

It may be understood that, in FIG. 5, the terminal device may delete the first card after the terminal device sets the alarm corresponding to the first time. Alternatively, the terminal device may delete the first card based on content shown in FIG. 7.

Figure 7:
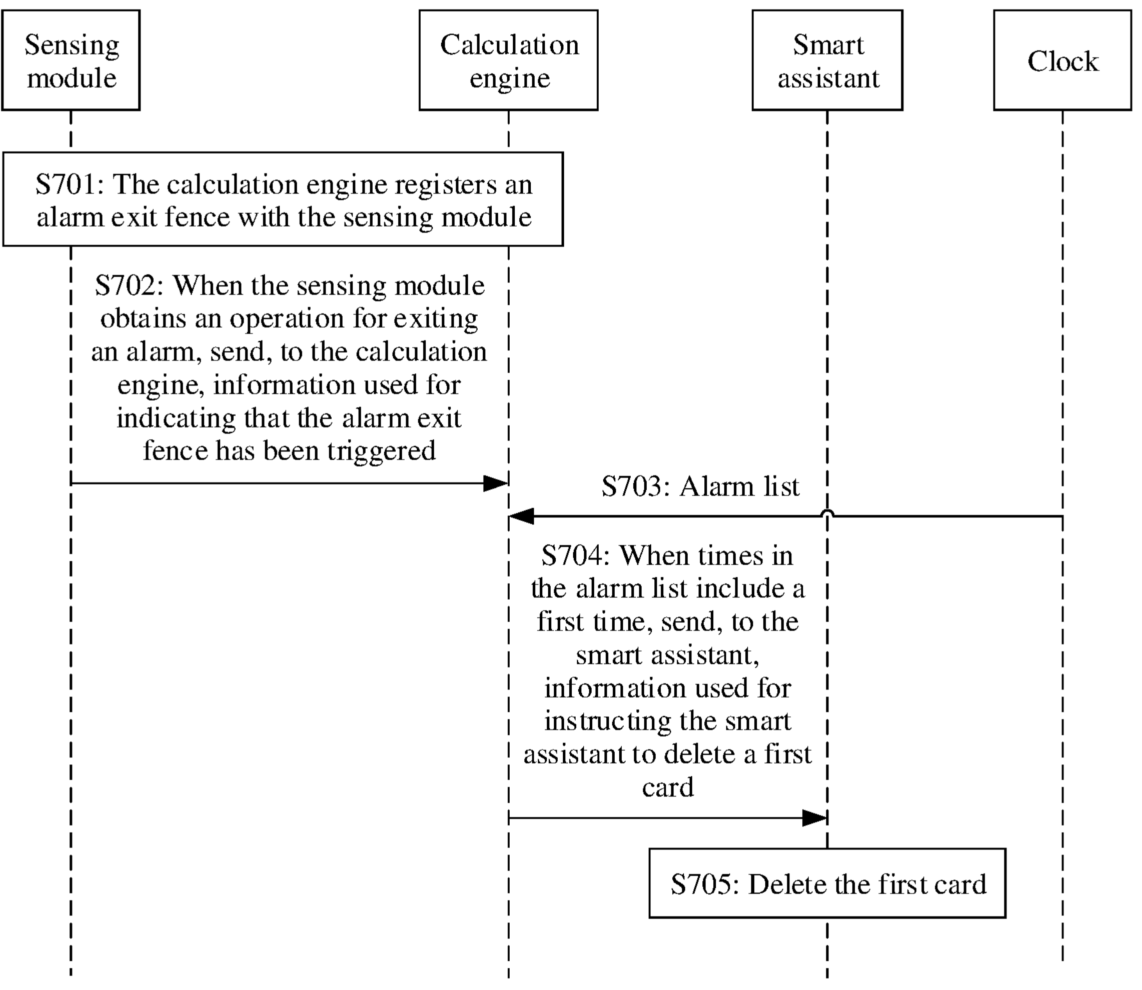
FIG. 7 is a schematic flowchart of an alarm setting method according to an embodiment of this application.

With reference to the content shown in FIG. 5 and FIG. 6, for example, FIG. 7 is a schematic flowchart of an alarm setting method according to an embodiment of this application. The method in this embodiment of this application may be applied after S502. As shown in FIG. 7, the following steps may be included.

S701: The calculation engine registers an alarm exit fence with the sensing module.

S702: When the sensing module obtains an operation for exiting an alarm, the sensing module sends, to the calculation engine, information used for indicating that the alarm exit fence has been triggered.

In this embodiment of this application, in S701 and S702, when registering the alarm exit fence with the sensing module, the calculation engine may instruct the sensing module to monitor a status indicating whether the user exits the alarm. In this way, when the user controls the terminal device to exit the alarm, the sensing module may send, to the calculation engine, the information used for indicating that the alarm exit fence has been triggered.

S703: The calculation engine obtains the alarm list from the clock.

In this embodiment of this application, the calculation engine obtains the alarm list from the clock through an alarm list query interface. Alternatively, it may be understood that the calculation engine may obtain the alarm list from the clock by using the clock node.

S704: When times in the alarm list include the first time, the calculation engine sends, to the smart assistant, information used for instructing the smart assistant to delete the first card.

It may be understood that, based on the alarm name corresponding to the first time, the calculation engine may alternatively determine whether to send, to the smart assistant, the information used for instructing the smart assistant to delete the first card. For example, when alarm names in the alarm list include the alarm name corresponding to the first time, the calculation engine may send, to the smart assistant, the information used for instructing the smart assistant to delete the first card.

S705: The smart assistant deletes the first card.

It may be understood that, in FIG. 7, the calculation engine does not send instruction information to the smart assistant when the times in the alarm list do not include the first time. In this way, the smart assistant always displays the first card by default, thereby reminding the user to set an alarm.

Figure 8:
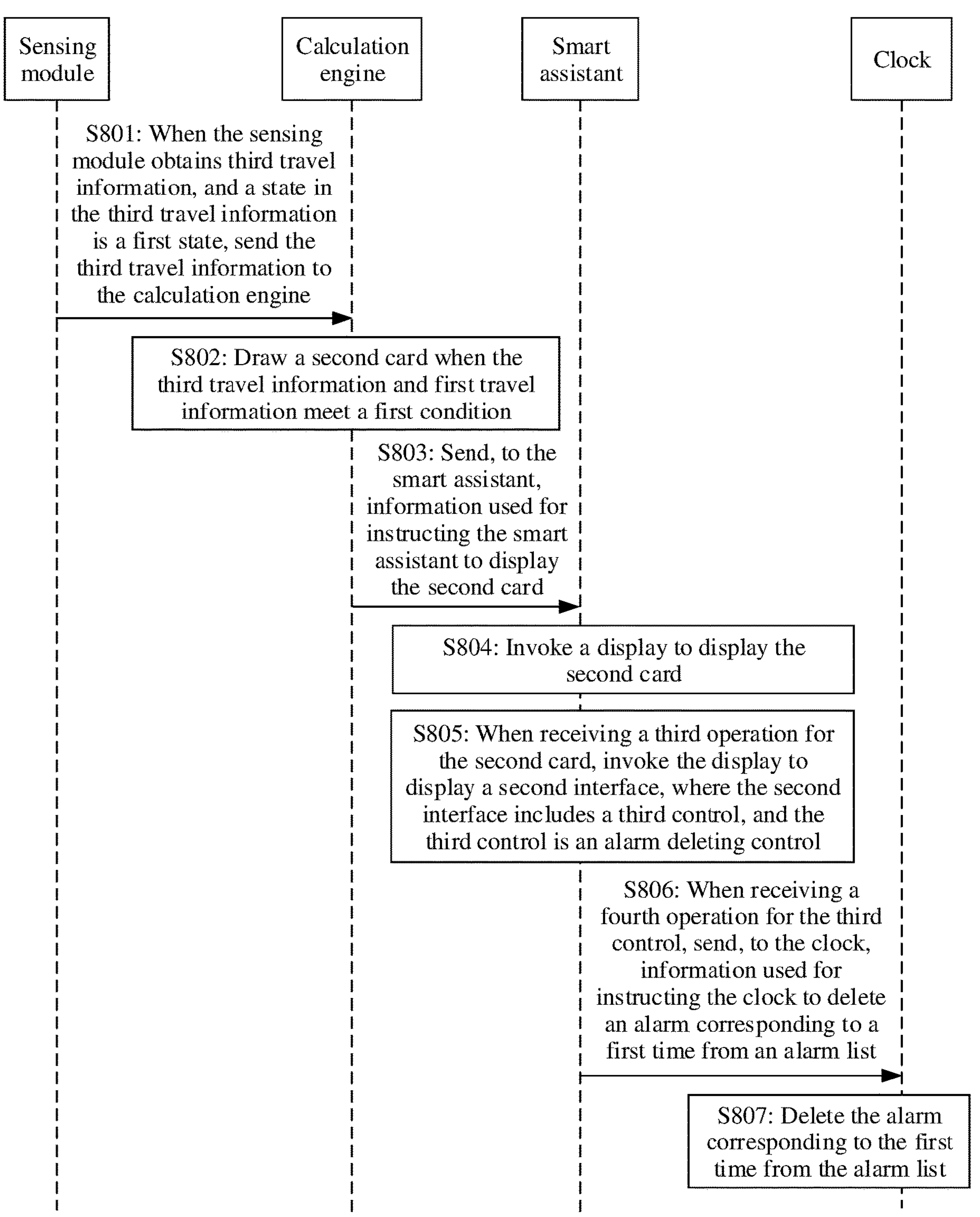
FIG. 8 is a schematic flowchart of an alarm setting method according to an embodiment of this application.

With reference to the content shown in FIG. 7, for example, FIG. 8 is a schematic flowchart of an alarm setting method according to an embodiment of this application. The method in this embodiment of this application may be applied after S705. As shown in FIG. 8, the following steps may be included.

S801: When the sensing module obtains third travel information, and a state in the third travel information is a first state, the sensing module sends the third travel information to the calculation engine.

In this embodiment of this application, the first state is a preset state, and the first state is used to indicate a travel status. For example, the first state may indicate that the travel status is refunded or the travel status is canceled.

S802: The calculation engine draws a second card when the third travel information and the first travel information meet a first condition.

In this embodiment of this application, the third travel information may include a second travel start position, a second travel start date, a second travel start time, and a second travel identifier, the first travel information includes a first travel start position, a first travel start time, a first travel identifier, and a first travel start date, that the third travel information and the first travel information meet a first condition includes: the first travel start time is the same as the second travel start time, the second travel identifier is the same as the first travel identifier, the first travel start position is the same as the second travel start position, and the second travel start date is the same as the first travel start date.

When the first travel information is flight information, the first travel identifier is a flight number, and the first travel start date is a flight departure date. For content of the third travel information, refer to a corresponding description of the content of the first travel information. Details are not described herein again.

S803: The calculation engine sends, to the smart assistant, information used for instructing the smart assistant to display the second card.

S804: The smart assistant invokes the display to display the second card.

S805: When receiving a third operation for the second card, the smart assistant invokes the display to display a second interface.

In this embodiment of this application, in S804 and S805, the second card is an alarm deleting card, the second interface includes a third control, and the third control is an alarm deleting control. That the smart assistant invokes, when receiving a third operation for the second card, the display to display a second interface may be understood as: the smart assistant receives the third operation for the second card, and invokes, in response to the third operation, the display to display the second interface.

S806: When receiving a fourth operation for a third control, the smart assistant sends, to the clock, information used for instructing the clock to delete the alarm corresponding to the first time from the alarm list.

In this embodiment of this application, that the smart assistant sends, to the clock when receiving a fourth operation for a third control, information used for instructing the clock to delete the alarm corresponding to the first time from the alarm list may be understood as: the smart assistant receives the fourth operation for the third control, and sends, to the clock in response to the fourth operation, the information used for instructing the clock to delete the alarm corresponding to the first time from the alarm list.

S807: The clock deletes the alarm corresponding to the first time from the alarm list.

It may be understood that, with reference to FIG. 5, the terminal device may delete the first card after the terminal device sets the alarm corresponding to the first time. Then, with reference to the content shown in FIG. 8, the terminal device may also display the second card.

Figure 9A:
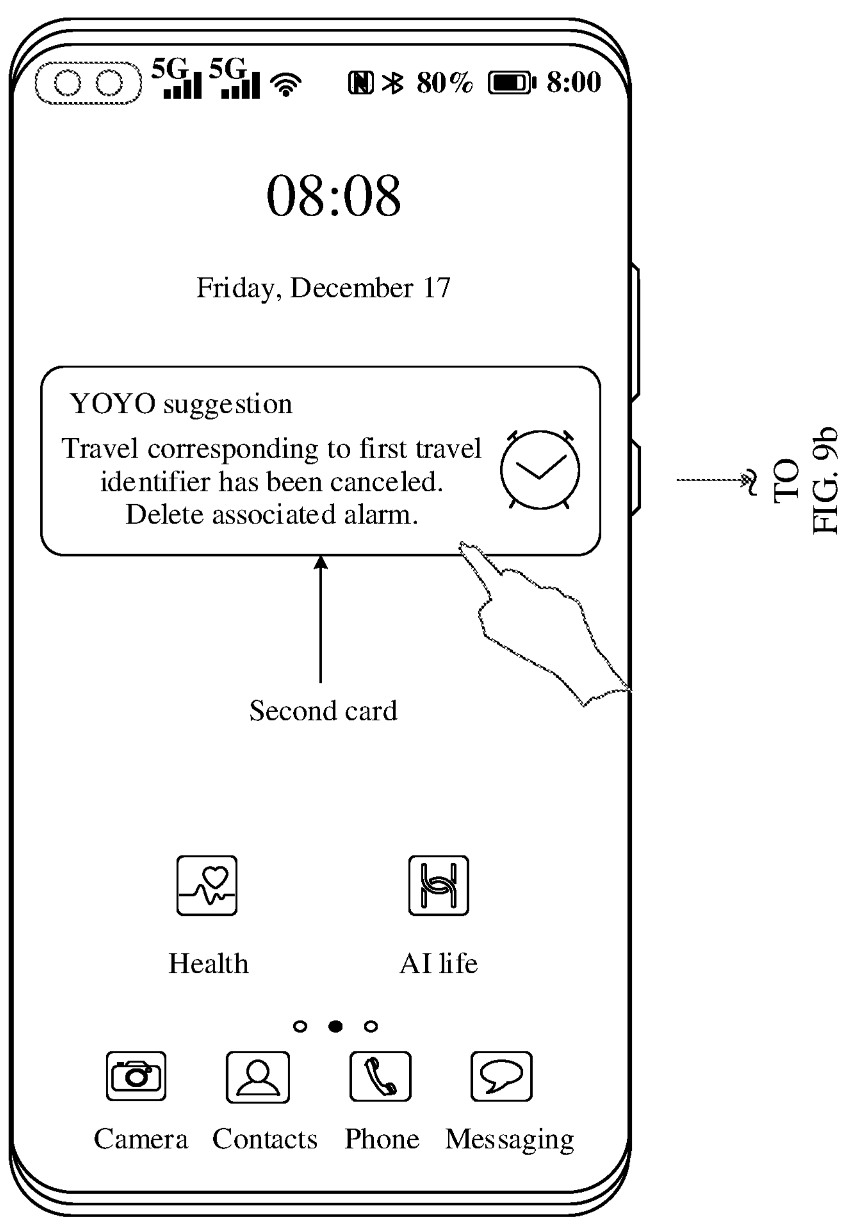
FIGS. 9*a*, 9*b*, and 9*c* illustrate a schematic diagram of an interface, by a terminal device, for deleting an alarm corresponding to a first time according to an embodiment of this application.
Figure 9B:
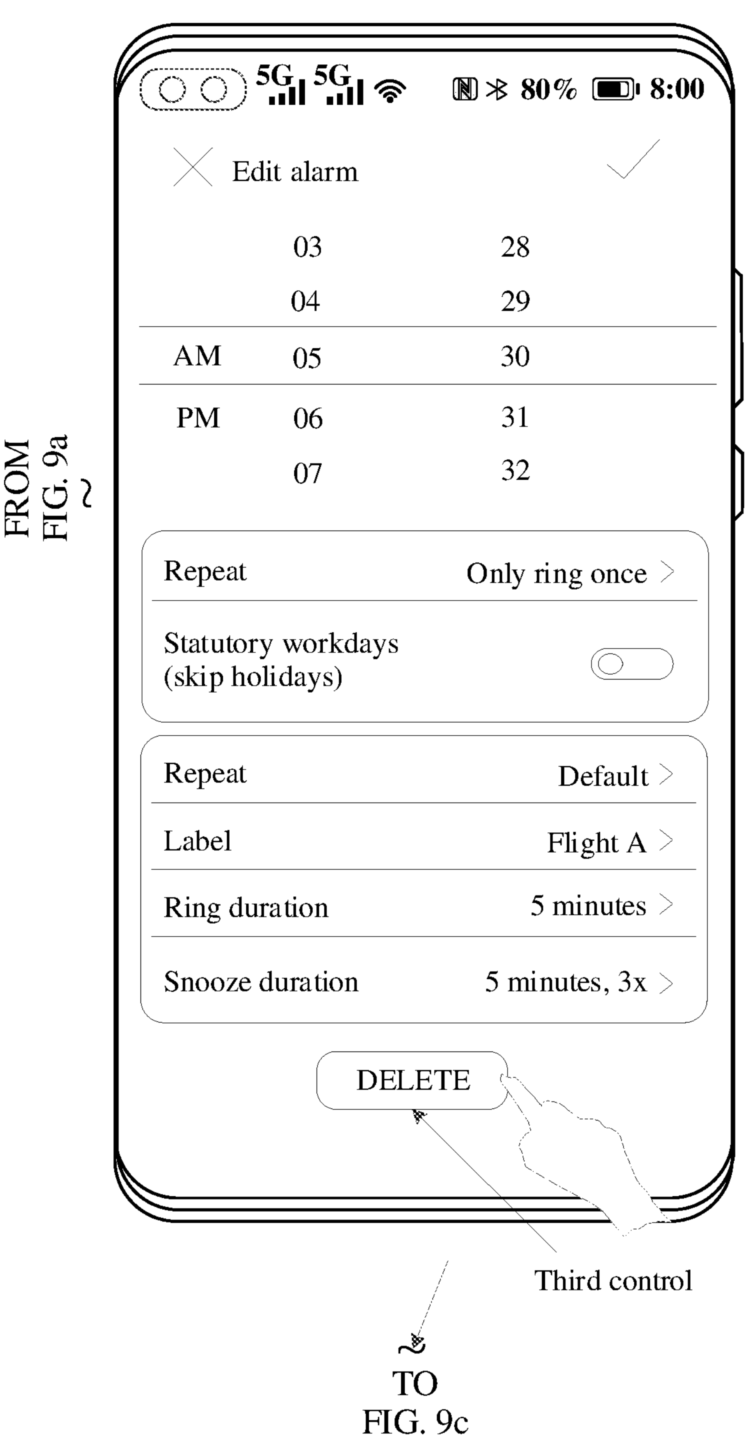
Figure 9C:
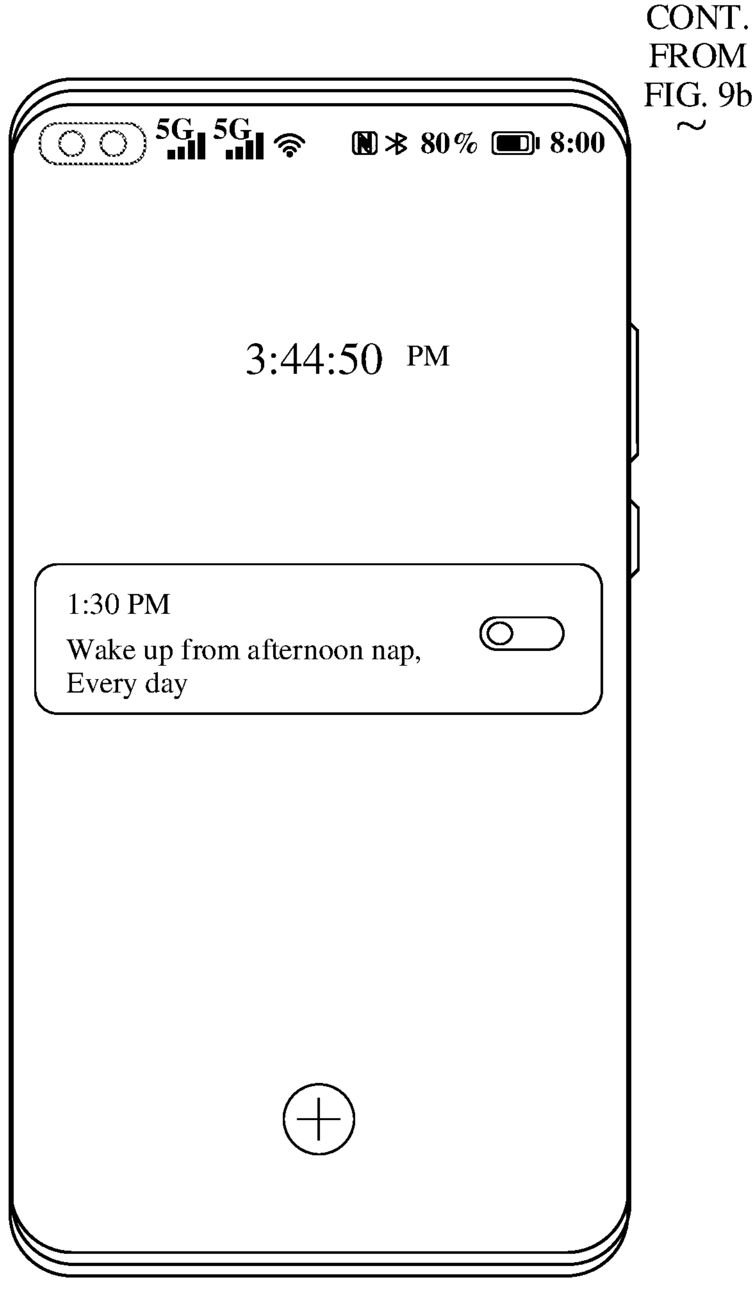

With reference to the content described in S804 and S807, and with reference to the content of the interface shown in FIG. 6, for example, FIG. 9 is a schematic diagram of an interface, by a terminal device, for deleting an alarm corresponding to a first time according to an embodiment of this application. This embodiment of this application is illustrated by using an example of canceling the first travel information. As shown in FIG. 9, the interface shown in FIG. 9*a* includes the second card. The second card includes information used for indicating that a travel corresponding to the first travel identifier has been canceled and that deleting an associated alarm is suggested. When the user triggers the second card by performing an operation such as clicking or touching, the terminal device receives a trigger for the second card performed by the user, and the terminal device may display the interface shown in FIG. 9*b*. This interface may be referred to as the second interface. The operation by which the user triggers the second card via clicking or touching may be referred to as the third operation.

In the interface shown in FIG. 9*b*, the interface includes the third control, and the third control is an alarm deleting control. When the user triggers the third control by performing an operation such as clicking or touching, the terminal device receives a trigger for the second control performed by the user, and the terminal device may display the interface shown in FIG. 9*c*. Compared with the interface shown in FIG. 6*c*, an added alarm time is deleted from this interface, that is, the alarm time indicating that the first time is 5:30 is deleted from this interface. The operation by which the user triggers the third control via clicking or touching may be referred to as the fourth operation.

With reference to the content shown in FIG. 8 and FIG. 9, it may be understood that, when the terminal device detects an operation of exiting the alarm, the terminal device may obtain the alarm list by using the calculation engine. When the calculation engine determines that the alarm list includes a time that is the same as the first time, the calculation engine may skip sending, to the smart assistant, information used for instructing the smart assistant to delete the second card. In this way, the smart assistant continues displaying the second card, thereby reminding the user. When the calculation engine determines that the alarm list does not include a time that is the same as the first time, the calculation engine may send, to the smart assistant, information used for instructing the smart assistant to delete the second card. When the smart assistant deletes the second card, the smart assistant also deletes data and a fence that are related to the second card.

Figure 10:
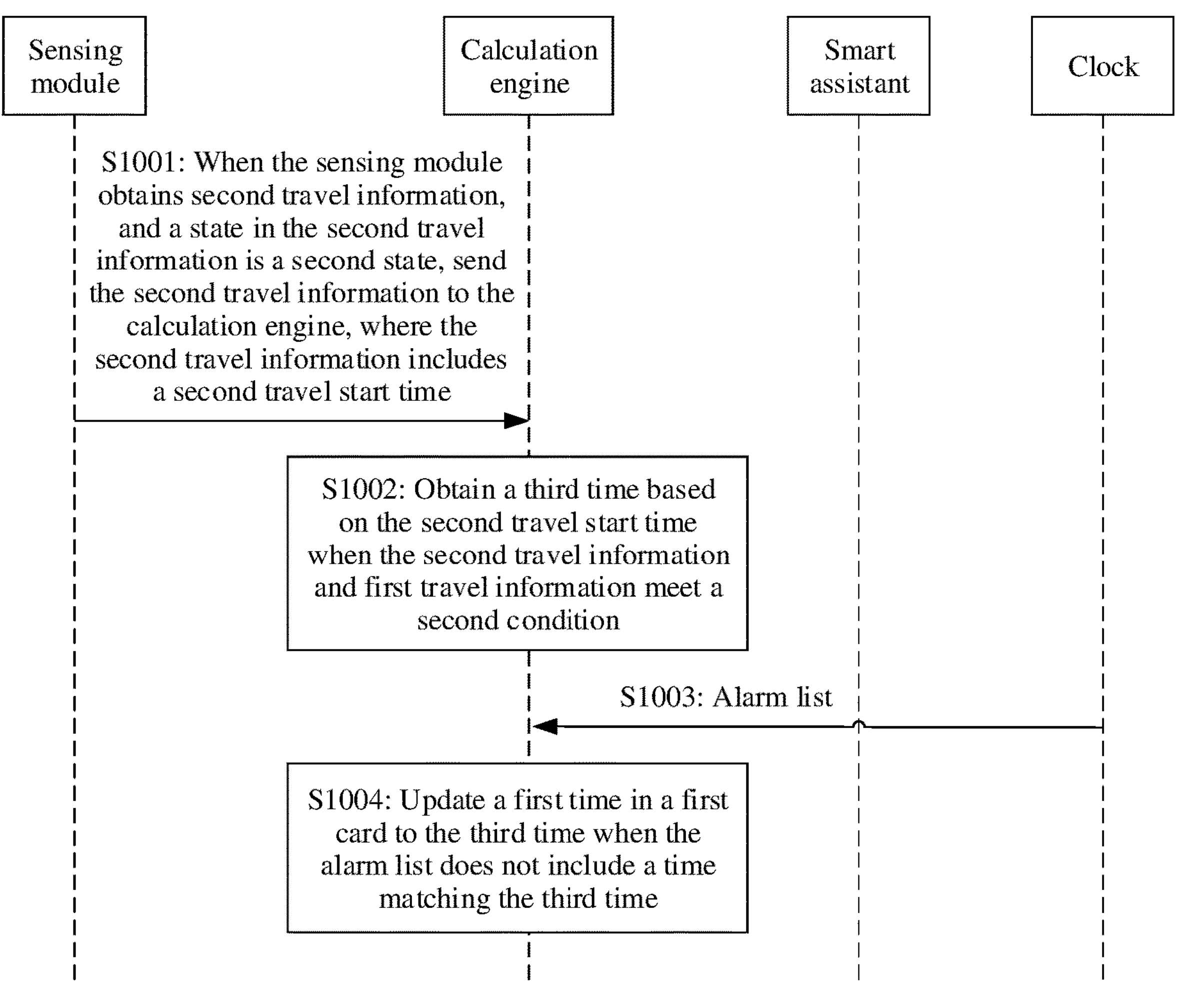
FIG. 10 is a schematic flowchart of an alarm setting method according to an embodiment of this application.

With reference to the content shown in FIG. 5, in a case that the terminal device has not received the second operation for the second control, for example, FIG. 10 is a schematic flowchart of an alarm setting method according to an embodiment of this application. As shown in FIG. 10, the following steps may be included.

S1001: When the sensing module obtains second travel information, and a state in the second travel information is a second state, the sensing module sends the second travel information to the calculation engine.

In this embodiment of this application, the second state is a preset state, and the second state is used to indicate a travel status. For example, the second state may indicate that the travel status is ticket-changed.

S1002: The calculation engine obtains a third time based on a second travel start time when the second travel information and the first travel information meet a second condition.

In this embodiment of this application, the second travel information may include a second travel start position, a second travel start date, the second travel start time, and a second travel identifier; and the first travel information may include the first travel start position, the first travel start time, a first travel identifier, and a first travel start date. For content of the second travel information, refer to a corresponding description of the content of the first travel information. Details are not described herein again. That the second travel information and the first travel information meet a second condition includes: the first travel start date is the same as the second travel start date, the first travel identifier is the same as the second travel identifier, the first travel start position is the same as the second travel start position, and an absolute value of a difference between the second travel start time and the first travel start time is less than or equal to a second threshold.

It should be understood that, in the second condition, if the first travel start date is different from the second travel start date, and the absolute value of the difference between the second travel start time and the first travel start time is greater than the threshold, it indicates that the user's travel has been changed greatly. Therefore, the terminal device may provide the user with another alarm adding card based on the second travel start date and the second travel start time in the second travel information. The terminal device may delete the first card.

In this embodiment of this application, the third time is a time obtained by subtracting the first duration from the second travel start time. For content of obtaining the first duration by the terminal device, refer to a corresponding description of the content of S403. Details are not described herein again.

S1003: The calculation engine obtains the alarm list from the clock.

S1004: The calculation engine updates the first time in the first card to the third time when the calculation engine determines that the alarm list does not include a time matching the third time.

In this embodiment of this application, for a process in which the user adds, to the alarm list, the third time displayed in the first card, reference may be made to a corresponding description of the content of the interface shown in FIG. 6. Details are not described herein again.

It may be understood that, before updating the first card, the first card includes the first travel information. Because the first travel start date is the same as the second travel start date, the first travel identifier is the same as the second travel identifier, and the second travel start time is different from the first travel start time, the calculation engine may further update the first travel start time in the first card to the second travel start time when updating the first time in the first card.

It may be understood that, in a case that the second travel start date is the same as the first travel start date, if the second travel start time is later than the first travel start time, the third time is later than the first time. When the second travel start time is earlier than the first travel start time, the third time is earlier than the first time. Specific values of the third time and the first time may be set based on actual application scenarios. This is not limited in this embodiment of this application.

With reference to the content shown in FIG. 10, it may be understood that, when the terminal device detects an operation of exiting the alarm, the terminal device may obtain the alarm list by using the calculation engine. When the calculation engine determines that the alarm list includes a time that is the same as the third time, the calculation engine may send, to the smart assistant, information used for instructing the smart assistant to delete the first card. When the smart assistant deletes the first card, the smart assistant deletes data and a fence that are related to the first card. When the calculation engine determines that the alarm list does not include a time that is the same as the third time, it indicates that the user has not added, in the clock, an alarm corresponding to the third time. Therefore, the calculation engine may skip sending, to the smart assistant, the information used for instructing the smart assistant to delete the first card. In this way, the smart assistant continues displaying the first card, thereby continuing reminding the user.

Figures 11, 12:
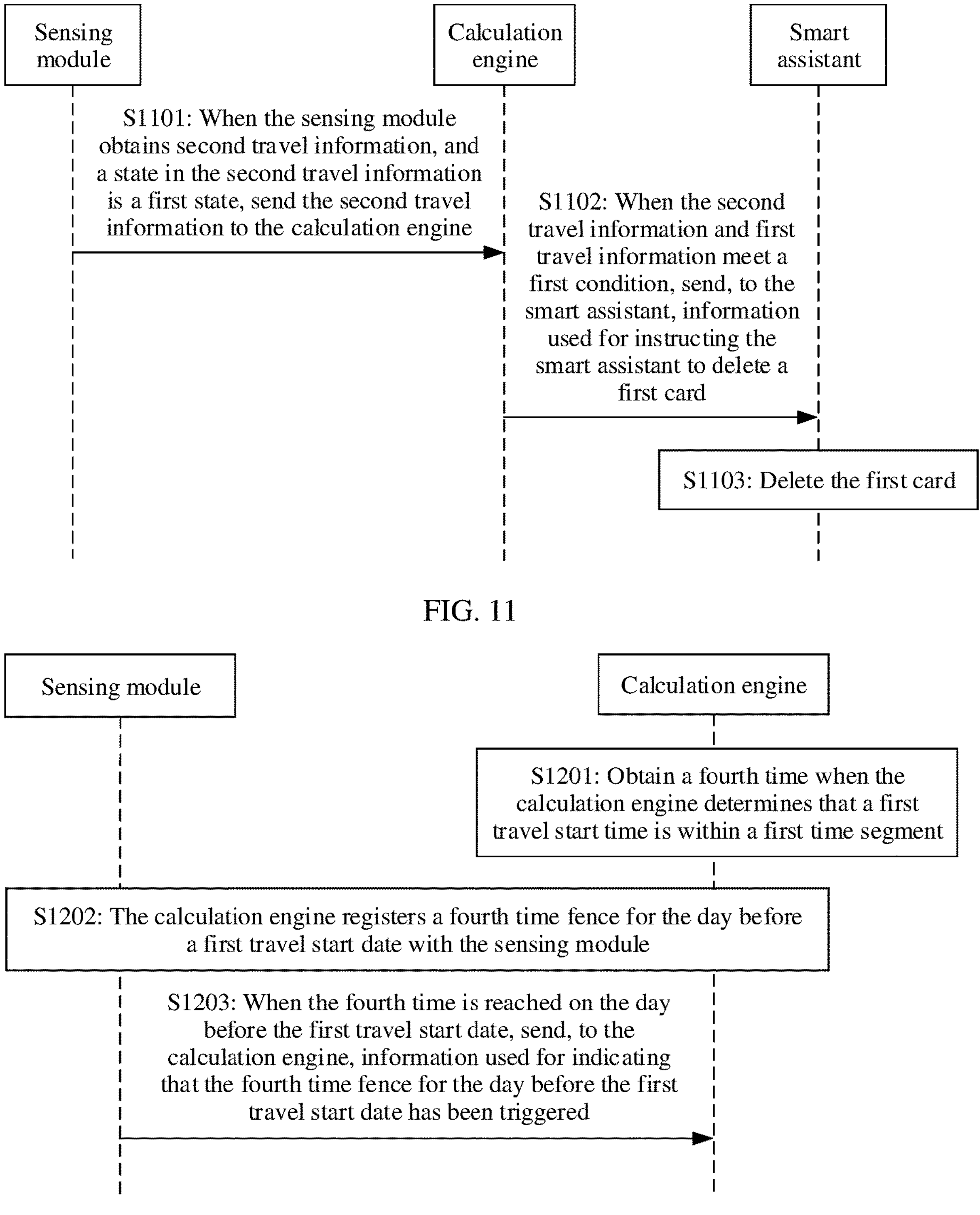
FIG. 11 is a schematic flowchart of an alarm setting method according to an embodiment of this application.
FIG. 12 is a schematic flowchart of an alarm setting method according to an embodiment of this application.

With reference to the content shown in FIG. 5, in a case that the terminal device has not received the second operation for the second control, for example, FIG. 11 is a schematic flowchart of an alarm setting method according to an embodiment of this application. As shown in FIG. 11, the following steps may be included.

S1101: When the sensing module obtains second travel information, and a state in the second travel information is a first state, the sensing module sends the second travel information to the calculation engine.

S1102: When the second travel information and the first travel information meet a first condition, the calculation engine sends, to the smart assistant, information used for instructing the smart assistant to delete the first card.

In this embodiment of this application, the second travel information may include a second travel start position, a second travel start date, a second travel start time, and a second travel identifier, the first travel information may include the first travel start position, the first travel start time, a first travel identifier, and a first travel start date, and that the second travel information and the first travel information meet a first condition includes: the second travel start time is the same as the first travel start time, the second travel identifier is the same as the first travel identifier, the first travel start position is the same as the second travel start position, and the second travel start date is the same as the first travel start date.

S1103: The smart assistant deletes the first card.

In this embodiment of this application, for the content of S1101 to S1003, refer to a corresponding description of the content shown in FIG. 8. Details are not described herein again. When the smart assistant deletes the first card, the smart assistant deletes data and a fence that are related to the first card.

With reference to the content shown in FIG. 4, for example, FIG. 12 is a schematic flowchart of an alarm setting method according to an embodiment of this application. As shown in FIG. 12, the following steps may be included.

S1201: The calculation engine obtains a fourth time based on a first travel start date when the calculation engine determines that the first travel start time is within a first time segment.

In this embodiment of this application, a possible implementation in which the calculation engine obtains the fourth time when the calculation engine determines that the first travel start time is within the first time segment is: when the calculation engine determines that the first travel start time is within the first time segment, the calculation engine obtains electricity usage amounts of the terminal device in a plurality of time segments from a service platform, where the plurality of time segments include a second time segment; and when the calculation engine determines that an electricity usage amount in the second time segment is less than or equal to a third threshold, the terminal device subtracts a sixth duration from an initial time of the second time segment, to obtain the fourth time. The second time segment may be understood as a sleep time segment of the user, or may be understood as a dormant time segment of the terminal device. Therefore, an electricity usage amount in this time segment is small.

S1202: A terminal device registers a fourth time fence for the day before the first travel start date with the sensing module by using the calculation engine.

S1202: When the fourth time is reached on the day before the first travel start date, the sensing module sends, to the calculation engine, information used for indicating that the fourth time fence for the day before the first travel start date has been triggered.

For example, the first time segment is 6:00 to 11:00, the first travel start date is the 10th, the first travel start time is 7:00, the first travel start time is within the first time segment, and the second time segment is 23:00 to 7:00. In this case, the initial time of the second time segment is 23:00. When the sixth duration is 2 hours, the fourth time is 21:00, and the fourth time on the day before the first travel start date is 21:00 on the 9th.

With reference to the embodiment shown in FIG. 4, it may be understood that, the sensing module sends, to the calculation engine, the information used for indicating that the fourth time fence for the day before the first travel start date has been triggered. After the calculation engine receives the information, the calculation engine may execute S406 and S407. With reference to the content shown in FIG. 12 and the content described in FIG. 4, the calculation engine draws the first card. The calculation engine may set a display status of the first card to a to-be-popped state. When the calculation engine receives, from the sensing module, the information used for indicating that the fourth time fence for the day before the first travel start date has been triggered, the calculation engine sends, to the smart assistant, information used for instructing the smart assistant to display the first card, so that the display status of the first card is updated from the to-be-popped state to a popped state.

Figure 13:
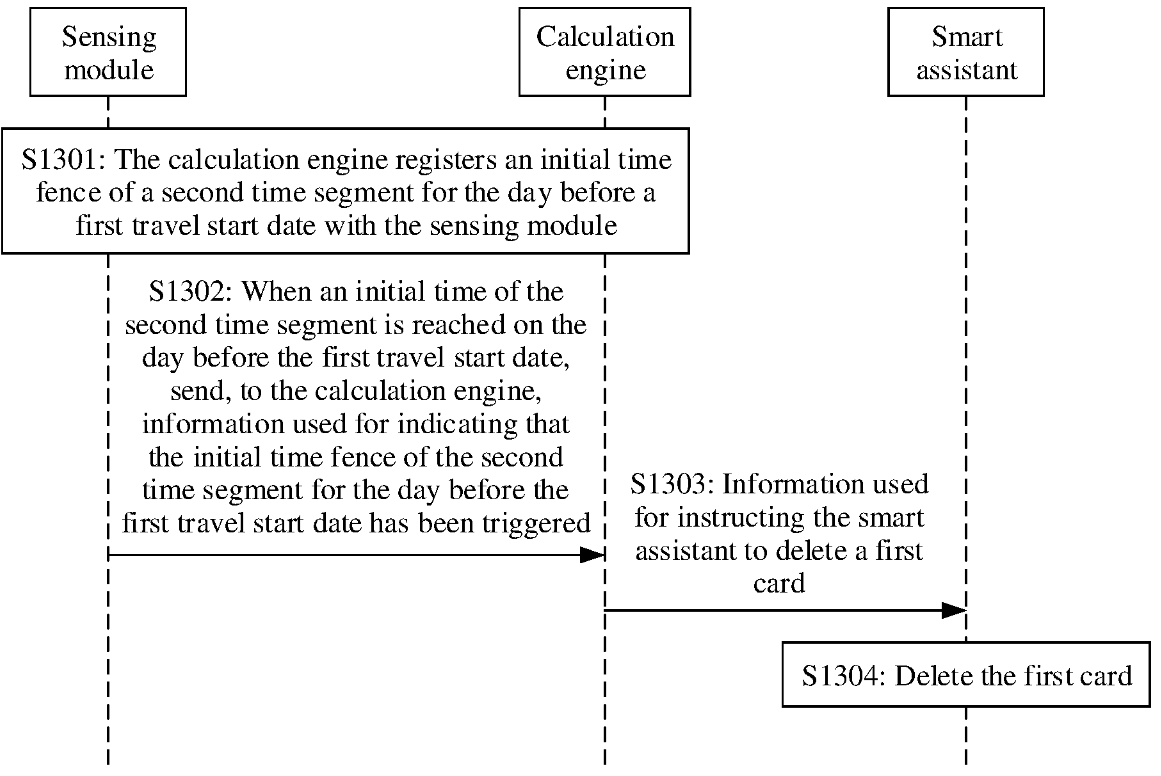
FIG. 13 is a schematic flowchart of an alarm setting method according to an embodiment of this application.

With reference to the content shown in FIG. 12 and the content shown in FIG. 5, when the terminal device has not received, on the first interface, an operation of confirming an alarm setting corresponding to the first time, or it may be understood that when the terminal device has not received the second operation for the second control, for example, FIG. 13 is a schematic flowchart of an alarm setting method according to an embodiment of this application. As shown in FIG. 13, the following steps may be included.

S1301: The calculation engine registers an initial time fence of a second time segment for the day before the first travel start date with the sensing module.

S1302: When an initial time of the second time segment is reached on the day before the first travel start date, the sensing module sends, to the calculation engine, information used for indicating that the initial time fence of the second time segment for the day before the first travel start date has been triggered.

S1303: The calculation engine sends, to the smart assistant, information used for instructing the smart assistant to delete the first card.

S1304: The smart assistant deletes the first card.

It may be understood that, when the smart assistant deletes the first card, the smart assistant may clear data and a fence that are related to the initial time fence of the second time segment for the day before the first travel start date.

It may be understood that, with reference to the content described in FIG. 12 and FIG. 13, when the fourth time is not reached on the day before the first travel start date, if the sensing module receives second travel information, the calculation engine determines that the first travel information and the second travel information meet a first condition. In this way, even if the fourth time is reached on the day before the first travel start date, the calculation engine does not instruct the smart assistant to invoke the display to display the first card, either.

Figures 14, 15:
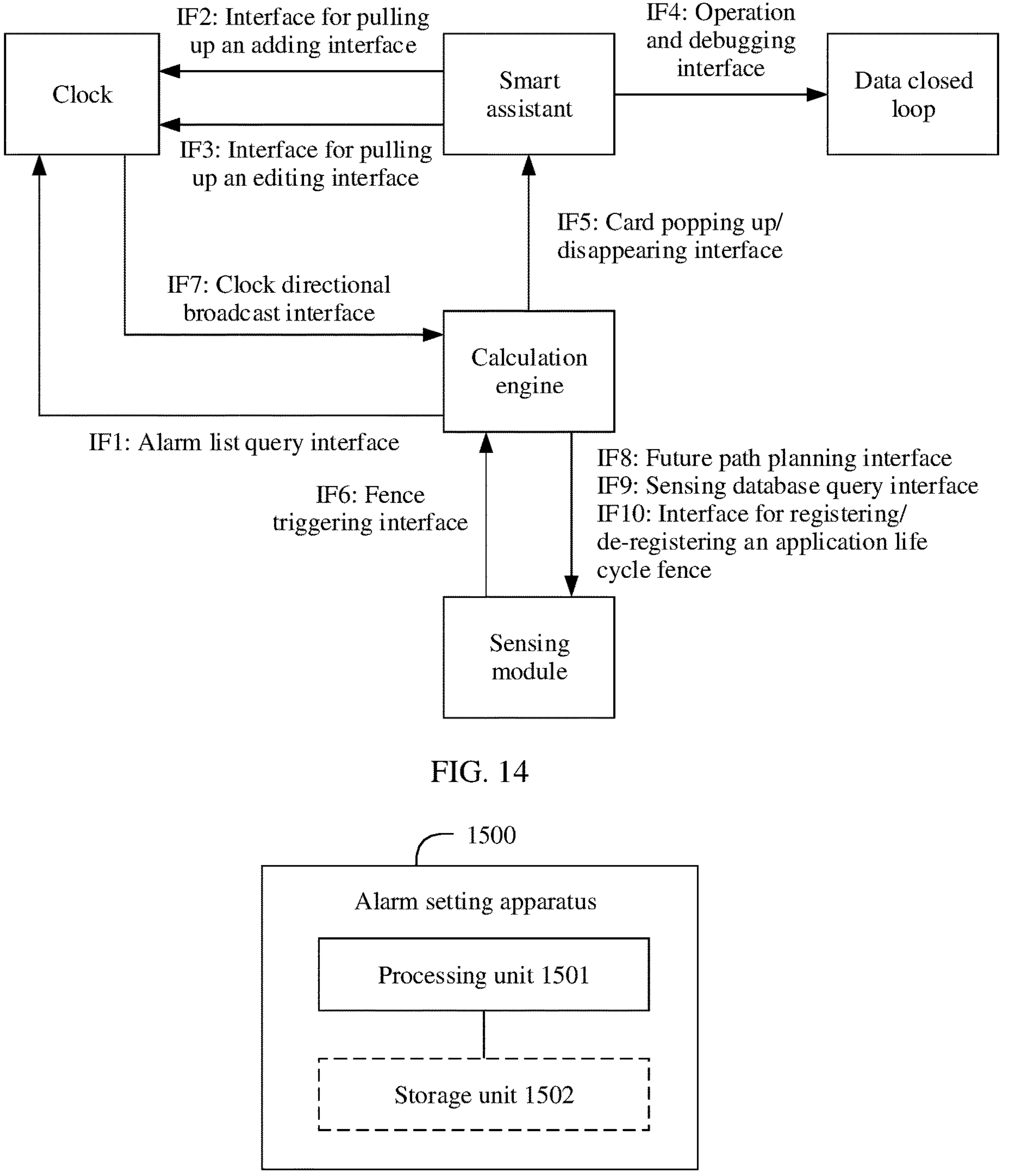
FIG. 14 is a schematic diagram of an interface according to an embodiment of this application.
FIG. 15 is a schematic diagram of a structure of an alarm setting apparatus according to an embodiment of this application.

To implement the manners described in some of the foregoing embodiments, for example, FIG. 14 is a schematic diagram of an interface according to an embodiment of this application. As shown in FIG. 14, the interface (interface, IF) described in FIG. 14 includes an alarm list query interface, an interface for pulling up a clock interface, an operation and debugging interface, a card popping up/disappearing interface, a fence triggering interface, a clock directional broadcast interface, a future path planning interface, a sensing database query interface, and an interface for registering/de-registering an application life cycle fence. The alarm list query interface may be referred to as IF1: the interface for pulling up the clock interface includes an interface IF2 for pulling up an alarm adding interface and an interface IF3 for pulling up an alarm editing interface: the operation and debugging interface may be referred to as IF4; the card popping up/disappearing interface may be referred to as IF5; the fence triggering interface may be referred to as IF6; the clock directional broadcast interface may be referred to as IF7; the future path planning interface may be referred to as IF8; the sensing database query interface may be referred to as IF9; and the interface for registering/de-registering the application life cycle fence may be referred to as IF10.

With reference to the content described in FIG. 14, table 1 shows naming of the interfaces and descriptions related to the interfaces. The content of table 1 is as follows:

TABLE 1

| Interface | Name | Description |
|---|---|---|
| IF1 | Alarm list query interface | IF1 is an interface provided for using a system clock application, and is used by a calculation engine to obtain an alarm list and implement end-to-end connection. |
| IF2/IF3 | Interface for pulling up a clock interface | Including an interface IF2 for pulling up an alarm adding interface and an interface IF3 for pulling up an alarm editing interface, which may transmit parameters such as an alarm time and an alarm name |
| IF4 | Operation and debugging interface | Interface for implementing operation and debugging of a data closed loop |
| IF5 | Card popping up/disappearing interface | Through which the calculation engine sends a card popping up instruction or a card disappearing instruction to a smart assistant, where when the calculation engine sends the card popping up instruction to the smart assistant, the calculation engine may also transmit parameters such as the alarm time and the alarm name to the smart assistant |
| IF6 | Fence triggering interface | Through which the calculation engine receives, from a sensing module, information indicating that a fence has been triggered |
| IF7 | Clock directional broadcast interface | Through which a clock sends a directional broadcast to the calculation engine after the smart assistant completes an operation of pulling up a clock interface |
| IF8 | Future path planning interface | Through which sensing is implemented by integrating a Gaode SDK |
| IF9 | Sensing database query interface | Through which data in a sensing database is queried (encapsulated inside the calculation engine) |
| IF10 | Interface for registering/de-registering an application life cycle fence | Used for registering/de-registering the application life cycle fence |

IF1 is an interface provided by a system application alarm. A calculation engine may obtain an alarm list from a clock through IF1, thereby implementing end-to-end connection. When a smart assistant invokes a display to display a first card, the first card includes a first control. Therefore, when a terminal device receives a user's trigger for the first control, the terminal device may invoke IF2 by using the smart assistant to pull up the alarm adding interface, so that the smart assistant may display a first interface. The first interface may also be referred to as an alarm setting interface, or an alarm adding interface, or a newly added alarm interface. When the smart assistant invokes the display to display a second card, and the terminal device receives the user's trigger for the second card, the terminal device may invoke IF3 by using the smart assistant to pull up the alarm editing interface, so that the smart assistant may display a second interface. The second interface may be referred to as the alarm editing interface.

IF4 is an interface for implementing operation and debugging of a data closed loop. If the user modifies a suggested alarm time in the newly added alarm interface, the smart assistant may record an alarm time modified by the user in an operation and debugging manner, thereby providing data for subsequently optimizing the user's suggested alarm time.

IF5 is used by the calculation engine to send a card popping up instruction or a card disappearing instruction to the smart assistant, so that the smart assistant is enabled to invoke the display to display a card, or the smart assistant is enabled to delete a card. Alternatively, it may be understood that, IF5 is used by the calculation engine to send, to the smart assistant, information used for instructing the smart assistant to delete a card or display a card. When the calculation engine sends, to the smart assistant, information used for instructing the smart assistant to display a card, the calculation engine may also transmit parameters such as a suggested alarm time and an alarm name to the smart assistant. IF6 is used by a sensing module to send, to the calculation engine, information used for indicating that a fence has been triggered, for example, information used for indicating that a time fence has been triggered.

When the user adds, to the alarm list, an alarm corresponding to a suggested alarm time, the clock may send a directional broadcast to the calculation engine through IF7, to indicate that the user has added the alarm corresponding to the suggested alarm time. Alternatively, when the user deletes, from the alarm list, an alarm corresponding to a suggested alarm time, the clock may send a directional broadcast to the calculation engine through IF7, to indicate that the alarm corresponding to the suggested alarm time has been deleted from the clock.

The calculation engine may obtain a second duration from the sensing module through IF8. The calculation engine may query sensing data from the sensing module through IF9. For example, the sensing data is a duration for traveling from a preset position to a travel start position. IF10 is used by the calculation engine to register and de-register an application life cycle with the sensing module. For example, when the calculation engine registers an alarm exit fence with the sensing module, the calculation engine may register an alarm life cycle fence with the sensing module through IF10, thereby instructing the sensing module to monitor the clock.

The foregoing describes the alarm setting method in embodiments of this application. The following describes an apparatus used for executing the alarm setting method and provided in embodiments of this application. Those skilled in the art may understand that the method and the apparatus can be combined with or incorporated into each other. The alarm setting apparatus provided in this embodiment of this application may perform the steps of the foregoing alarm setting method.

For example, FIG. 15 is a schematic diagram of a structure of an alarm setting apparatus according to an embodiment of this application. As shown in FIG. 15, the apparatus 1500 may be a terminal device, or may be a chip or a chip system in the terminal device. The apparatus 1500 includes a processing unit 1501. The processing unit 1501 is configured to support the alarm setting apparatus in performing an information processing step.

For example, the processing unit is configured to display a first card when the terminal device receives first travel information, where the first card includes the first travel information and alarm setting information, the alarm setting information includes a first control and a first time, and the first time is a suggested alarm time. The processing unit is further configured to receive a first operation for the first control. The processing unit is further configured to display a first interface in response to the first operation, where the first interface is an alarm setting interface on which the first time has been selected. The processing unit is further configured to set an alarm corresponding to the first time when an operation of confirming an alarm setting corresponding to the first time is received on the first interface.

In a possible implementation, the first travel information includes a first travel start time and a first travel start position. The processing unit is specifically configured to: when the terminal device receives the first travel information, calculate a difference between the first travel start time and a first duration to obtain the first time, where the first duration is a sum of a second duration, a third duration, and a fourth duration, the second duration is a duration for traveling from a preset position to the first travel start position, the third duration is a duration for which a user needs to stay at the preset position, and the fourth duration is a duration for which the user needs to stay at the first travel start position: obtain an alarm list, where the alarm list includes a plurality of times; and display the first card when the terminal device determines that each of the plurality of times is later than the first time: display the first card when the terminal device determines that one time in the plurality of times is earlier than the first time and that a difference between the one time in the plurality of times and the first time is greater than a first threshold: or display the first card when the terminal device determines that one time in the plurality of times is earlier than the first time, that a difference between the one time in the plurality of times and the first time is less than or equal to the first threshold, and that a state of an alarm corresponding to the one time in the plurality of times is an off state.

In a possible implementation, the processing unit is specifically configured to: integrate a software development kit SDK of a map application: obtain the second duration from the SDK of the map application: calculate the sum of the second duration, the third duration, and the fourth duration to obtain the first duration; and calculate the difference between the first travel start time and the first duration to obtain the first time.

In a possible implementation, the alarm list includes a second time. The processing unit is specifically configured to: obtain a plurality of fifth durations from a service platform when the terminal device determines that the second time is a wake-up alarm time and that an alarm date corresponding to the second time is within a first date period, where the service platform is configured to serve the terminal device, any duration in the plurality of fifth durations is a duration for which the terminal device stayed at the preset position in history after the second time, and the first date period includes a plurality of dates of workdays: cluster the plurality of fifth durations to obtain a plurality of first curves: fit the plurality of first curves into a second curve: when an area ratio of one curve in the plurality of first curves to the second curve is a maximum value, determine a duration corresponding to the one first curve in the plurality of first curves as the third duration; and calculate the sum of the second duration, the third duration, and the fourth duration to obtain the first duration.

In a possible implementation, the processing unit is specifically configured to: obtain, from the service platform, a plurality of durations for which the terminal device stayed at the first travel start position in history: calculate an average duration of the plurality of durations for which the terminal device stayed at the first travel start position in history, to obtain the fourth duration; and calculate the sum of the second duration, the third duration, and the fourth duration to obtain the first duration.

In a possible implementation, the first interface includes a second control. The processing unit is specifically configured to: set the alarm corresponding to the first time when a second operation for the second control is received.

In a possible implementation, the processing unit is further configured to: receive second travel information in a case that the second operation for the second control is not received; and delete the first card when the terminal device determines that a state in the second travel information is a first state and that the second travel information and the first travel information meet a first condition, where the first state is used to indicate travel status, and the first state indicates that the travel status is refunded or the travel status is canceled.

In a possible implementation, the second travel information includes a second travel start position, a second travel start date, a second travel start time, and a second travel identifier, the first travel information includes the first travel start position, the first travel start time, a first travel identifier, and a first travel start date, and that the second travel information and the first travel information meet a first condition includes: the second travel start time is the same as the first travel start time, the second travel identifier is the same as the first travel identifier, the second travel start position is the same as the first travel start position, and the second travel start date is the same as the first travel start date.

In a possible implementation, the processing unit is further configured to: receive second travel information in a case that the second operation for the second control is not received, where the second travel information includes a second travel start time: obtain a third time based on the second travel start time when the terminal device determines that a state in the second travel information is a second state and that the second travel information and the first travel information meet a second condition, where the third time is a suggested alarm time, the second state is used to indicate travel status, and the second state indicates that the travel status is ticket-changed; and update the first time in the first card to the third time.

In a possible implementation, the second travel information further includes a second travel start position, a second travel start date, and a second travel identifier, the first travel information includes the first travel start position, the first travel start time, a first travel identifier, and a first travel start date, and that the second travel information and the first travel information meet a second condition includes: the first travel start date is the same as the second travel start date, the first travel identifier is the same as the second travel identifier, the first travel start position is the same as the second travel start position, and an absolute value of a difference between the second travel start time and the first travel start time is less than or equal to a second threshold.

In a possible implementation, the first travel information includes a first travel start time and a first travel start date. The processing unit is further configured to: obtain electricity usage amounts of the terminal device in a plurality of time segments from a service platform when the first travel start time is within a first time segment, where the service platform is configured to serve the terminal device, and the plurality of time segments include a second time segment: subtract a sixth duration from an initial time of the second time segment when the terminal device determines that an electricity usage amount in the second time segment is less than or equal to a third threshold, to obtain a fourth time; and display the first card when the fourth time is reached on the day before the first travel start date.

In a possible implementation, the processing unit is further configured to: delete the first card when the terminal device determines that the initial time of the second time segment is reached on the day before the first travel start date and that the terminal device has not received, on the first interface, the operation of confirming the alarm setting corresponding to the first time.

In a possible implementation, the processing unit is further configured to: receive third travel information: display a second card when a state in the third travel information is a first state and that the third travel information and the first travel information meet a first condition, where the second card is used to suggest deleting the alarm setting corresponding to the first time, the first state is used to indicate travel status, and the first state indicates that the travel status is refunded or the travel status is canceled: receive a third operation for the second card: display a second interface in response to the third operation, where the second interface includes a third control: receive a fourth operation for the third control; and delete the alarm corresponding to the first time in response to the fourth operation.

In a possible implementation, the first travel information includes a first travel start position, a first travel start time, a first travel identifier, and a first travel start date, the third travel information includes a third travel start position, a third travel start date, a third travel start time, and a third travel identifier, and that the third travel information and the first travel information meet a first condition includes: the first travel start time is the same as the third travel start time, the third travel identifier is the same as the first travel identifier, the first travel start position is the same as the third travel start position, and the third travel start date is the same as the first travel start date.

In a possible embodiment, the alarm setting apparatus may further include a storage unit 1502. The processing unit 1501 and the storage unit 1502 are connected to each other through a communication bus.

The storage unit 1502 may include one or more memories. The memories may be components that are used by one or more devices or circuits for storing a program or data.

The storage unit 1502 may exist independently and be connected to the processing unit 1501 of the alarm setting apparatus through a communication bus. The storage unit 1502 may alternatively be integrated into a circuit, a hardware component, or a chip.

Figure 16:
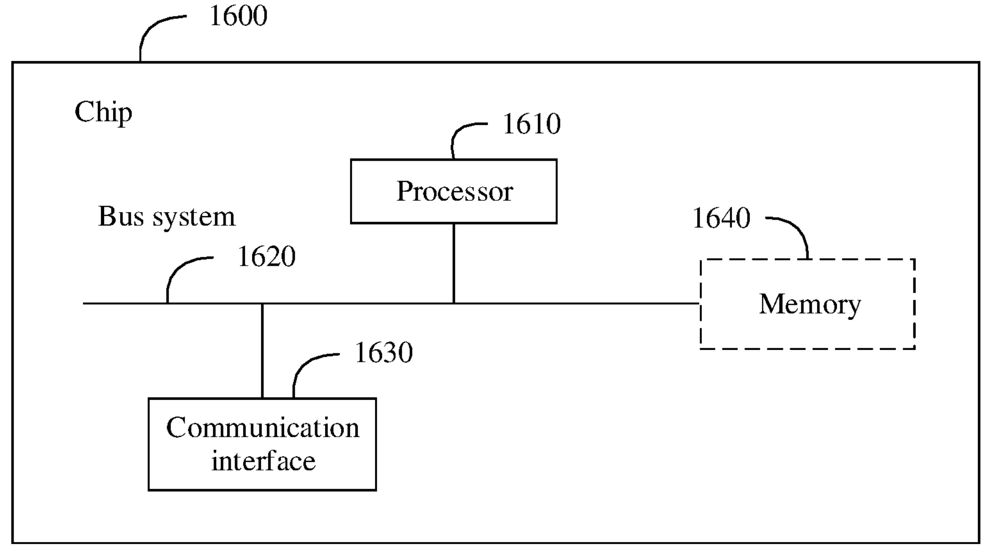
FIG. 16 is a schematic structural diagram of a chip according to an embodiment of this application.

For example, FIG. 16 is a schematic diagram of a structure of a chip according to an embodiment of this application. The chip 1600 includes one or more processors 1610 and a communication interface 1630.

In some implementations, the memory 1640 stores the following elements: an executable module or a data structure, a subset thereof, or an extended set thereof.

In this embodiment of this application, the memory 1640 may include a read-only memory and a random access memory, and provide an instruction and data for the processor 1610. A part of the memory 1640 may further include a non-volatile random access memory (non-volatile random access memory, NVRAM).

In this embodiment of this application, the memory 1640, the communication interface 1630, and the memory 1640 are coupled together through a bus system 1620. In addition to a data bus, the bus system 1620 may further include a power bus, a control bus, a status signal bus, and the like. For ease of description, various buses are marked as the bus system 1620 in FIG. 16.

The method described in the foregoing embodiments of this application may be applied to the processor 1610, or may be implemented by the processor 1610. The processor 1610 may be an integrated circuit chip and has a signal processing capability. In an implementation process, the steps of the foregoing method may be completed by hardware integrated logic circuits in the processor 1610 or instructions in a form of software. The foregoing processor 1610 may be a general-purpose processor (for example, a micro-processor or a conventional processor), a digital signal processor (digital signal processing, DSP), an application-specific integrated circuit (application specific integrated circuit, ASIC), a field-programmable gate array (field-programmable gate array, FPGA) or another programmable logic device, a discrete gate, a transistor logic device, or a discrete hardware component. The processor 1610 may implement or perform the methods, steps, and logical block diagrams that are disclosed in the embodiments of the present invention.

The steps of the method in the embodiments of this application may be directly performed by a hardware decoding processor or performed by a combination of hardware and software modules in the decoding processor. The software module may be located in a mature storage medium in the art, such as a random access memory, a read-only memory, a programmable read-only memory, or an electrically erasable programmable read-only memory (electrically erasable programmable read only memory, EEPROM). The storage medium is located in the memory 1640. The processor 1610 reads information in the memory 1640, and completes the steps of the foregoing method in combination with hardware of the processor 1610.

In the foregoing embodiment, the instructions stored by the memory and executed by the processor may be implemented in a form of a computer program product. The computer program product may be written into the memory in advance, or may be downloaded to and installed in the memory in a form of software.

The computer program product includes one or more computer instructions. When the computer program instructions are loaded and executed on a computer, some or all of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, and microwave) manner. The computer-readable storage medium may be any usable medium accessible by a computer, or a data storage device, such as a server or a data center, integrating one or more usable media. The usable medium may include a magnetic medium (for example, a floppy disk, a hard disk, or a magnetic tape), an optical medium (for example, a digital versatile disc (digital versatile disc, DVD)), a semiconductor medium (for example, a solid-state disk (solid state disk, SSD)), or the like.

An embodiment of this application further provides a computer-readable storage medium. Some or all of the functions of the method described in the foregoing embodiments may be implemented by software, hardware, firmware, or any combination thereof. The computer-readable medium may include a computer storage medium and a communication medium, and may further include any medium that enables a computer program to be transmitted from one place to another place. The storage medium may be any target medium accessible to a computer.

As a possible design, the computer-readable medium may include a compact disc read-only memory (compact disc read-only memory, CD-ROM), a RAM, a ROM, an EEPROM, or another optical disk memory. The computer-readable medium may include a magnetic disk storage or another magnetic disk storage device. In addition, any connection line may be appropriately referred to as a computer-readable medium. For example, if software is transmitted from a website, a server, or another remote source by using a coaxial cable, an optical fiber cable, a twisted pair, a DSL, or a wireless technology (such as infrared, radio, or microwave), the coaxial cable, the optical fiber cable, the twisted pair, the DSL, or the wireless technology such as infrared, radio, or microwave is included in a definition of a medium. A magnetic disk and a compact disc used in this specification include a compact disc (CD), a laser disc, an optical disc, a digital versatile disc (digital versatile disc, DVD), a floppy disk, and a blue-ray disc. The magnetic disk generally duplicates data magnetically, while the compact disc generally duplicates data optically through laser.

The foregoing combination should also be included in the scope of the computer-readable medium. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An alarm setting method, applied to a terminal device and comprising:

displaying, by the terminal device, a first card when the terminal device receives first travel information, wherein the first card comprises the first travel information and alarm setting information, the alarm setting information comprises a first control and a first time, and the first time is a suggested alarm time;

receiving a first operation for the first control;

displaying, by the terminal device, a first interface in response to the first operation, wherein the first interface is an alarm setting interface on which the first time has been selected, and the first interface comprises a second control; and setting, by the terminal device, an alarm corresponding to the first time when a second operation for the second control is received, wherein the terminal device comprises a sensing module, a calculation engine, a clock, and a smart assistant;

wherein the first travel information comprises a first travel start time and a first travel start position, and the displaying, by the terminal device, a first card when the terminal device receives first travel information comprises:

registering by the calculation engine, a travel information fence with the sensing module by using a travel association node;

when the terminal device receives the first travel information, calculating, by the terminal device, a difference between the first travel start time and a first duration to obtain the first time, wherein the first duration is a sum of a second duration, a third duration, and a fourth duration, the second duration is a duration for traveling from a preset position to the first travel start position, the third duration is a duration for which a user needs to stay at the preset position, and the fourth duration is a duration for which the user needs to stay at the first travel start position;

obtaining, by the terminal device, an alarm list, wherein the alarm list comprises a plurality of times; and displaying, by the terminal device, the first card when the terminal device determines that each of the plurality of times is later than the first time;

displaying, by the terminal device, the first card when the terminal device determines that one time in the plurality of times is earlier than the first time and that a difference between the one time in the plurality of times and the first time is greater than a first threshold; or displaying, by the terminal device, the first card when the terminal device determines that one time in the plurality of times is earlier than the first time, that a difference between the one time in the plurality of times and the first time is less than or equal to the first threshold, and that a state of an alarm corresponding to the one time in the plurality of times is an off state, wherein the calculating, by the terminal device, a difference between the first travel start time and a first duration to obtain the first time comprises:

integrating, by the terminal device, a software development kit (SDK) of a map application;

obtaining, by the terminal device, the second duration from the SDK of the map application;

calculating, by the terminal device, the sum of the second duration, the third duration, and the fourth duration to obtain the first duration; and calculating, by the terminal device, the difference between the first travel start time and the first duration to obtain the first time, and wherein the alarm list comprises a second time, and the calculating, by the terminal device, the sum of the second duration, the third duration, and the fourth duration to obtain the first duration comprises:

obtaining, by the terminal device, a plurality of fifth durations from a service platform when the terminal device determines that the second time is a wake-up alarm time and that an alarm date corresponding to the second time is within a first date period, wherein the service platform is configured to serve the terminal device, any duration in the plurality of fifth durations is a duration for which the terminal device stayed at the preset position in history after the second time, and the first date period comprises a plurality of dates of workdays;

clustering, by the terminal device, the plurality of fifth durations to obtain a plurality of first curves;

fitting, by the terminal device, the plurality of first curves into a second curve;

when an area ratio of one first curve in the plurality of first curves to the second curve is a maximum value, determining, by the terminal device, a duration corresponding to the one first curve in the plurality of first curves as the third duration;

obtaining, from the service platform by the terminal device, a plurality of durations for which the terminal device stayed at the first travel start position in history;

calculating, by the terminal device, an average duration of the plurality of durations for which the terminal device stayed at the first travel start position in history, to obtain the fourth duration; and calculating, by the terminal device, the sum of the second duration, the third duration, and the fourth duration to obtain the first duration, wherein the sensing module integrates the SDK of the map application, obtains the second duration from the SDK of the man application and sends the second duration to the calculation engine;

wherein the alarm list is obtained by the calculation engine from the clock;

wherein the displaying, by the terminal device, the first card comprises drawing, by the calculation engine, the first card, sending, by the calculation engine, information used for instructing the smart assistant to display the first card, and invoking, by the smart assistant, a display to display the first card; and wherein the first interface is an alarm setting interface on which the first time is selected.

2. The method according to claim 1, further comprising:

receiving, by the terminal device, second travel information in a case that the second operation for the second control is not received; and deleting, by the terminal device, the first card when the terminal device determines that a state in the second travel information is a first state and that the second travel information and the first travel information meet a first condition, wherein the first state is used to indicate travel status, and the first state indicates that the travel status is refunded or the travel status is canceled, wherein the second travel information comprises a second travel start position, a second travel start date, a second travel start time, and a second travel identifier, the first travel information comprises the first travel start position, the first travel start time, a first travel identifier, and a first travel start date, and that the second travel information and the first travel information meet a first condition comprises:

the second travel start time is the same as the first travel start time, the second travel identifier is the same as the first travel identifier, the second travel start position is the same as the first travel start position, and the second travel start date is the same as the first travel start date.

3. The method according to claim 1, further comprising:

receiving, by the terminal device, second travel information in a case that the second operation for the second control is not received, wherein the second travel information comprises a second travel start time;

obtaining, by the terminal device, a third time based on the second travel start time when the terminal device determines that a state in the second travel information is a second state and that the second travel information and the first travel information meet a second condition, wherein the third time is a suggested alarm time, the second state is used to indicate travel status, and the second state indicates that the travel status is ticket-changed; and updating, by the terminal device, the first time in the first card to the third time.

4. The method according to claim 3, wherein the second travel information further comprises a second travel start position, a second travel start date, and a second travel identifier, the first travel information comprises the first travel start position, the first travel start time, a first travel identifier, and a first travel start date, and that the second travel information and the first travel information meet a second condition comprises:

the first travel start date is the same as the second travel start date, the first travel identifier is the same as the second travel identifier, the first travel start position is the same as the second travel start position, and an absolute value of a difference between the second travel start time and the first travel start time is less than or equal to a second threshold.

5. The method according to claim 1, wherein the first travel information comprises a first travel start time and a first travel start date, and the displaying, by the terminal device, a first card when the terminal device receives first travel information comprises:

obtaining, by the terminal device, electricity usage amounts of the terminal device in a plurality of time segments from a service platform when the first travel start time is within a first time segment, wherein the service platform is configured to serve the terminal device, and the plurality of time segments comprise a second time segment;

subtracting, by the terminal device, a sixth duration from an initial time of the second time segment when the terminal device determines that an electricity usage amount in the second time segment is less than or equal to a third threshold, to obtain a fourth time;

displaying, by the terminal device, the first card when the fourth time is reached on the day before the first travel start date; and deleting, by the terminal device, the first card when the terminal device determines that the initial time of the second time segment is reached on the day before the first travel start date and that the terminal device has not received, on the first interface, the operation of confirming the alarm setting corresponding to the first time.

6. The method according to claim 1, after the setting, by the terminal device, an alarm corresponding to the first time, further comprising:

receiving, by the terminal device, third travel information;

displaying, by the terminal device, a second card when a state in the third travel information is a first state and that the third travel information and the first travel information meet a first condition, wherein the second card is used to suggest deleting the alarm setting corresponding to the first time, the first state is used to indicate travel status, and the first state indicates that the travel status is refunded or the travel status is canceled;

receiving a third operation for the second card;

displaying, by the terminal device, a second interface in response to the third operation, wherein the second interface comprises a third control;

receiving a fourth operation for the third control; and deleting, by the terminal device, the alarm corresponding to the first time in response to the fourth operation, wherein the first travel information comprises a first travel start position, a first travel start time, a first travel identifier, and a first travel start date, the third travel information comprises a third travel start position, a third travel start date, a third travel start time, and a third travel identifier, and that the third travel information and the first travel information meet a first condition comprises:

the first travel start time is the same as the third travel start time, the third travel identifier is the same as the first travel identifier, the first travel start position is the same as the third travel start position, and the third travel start date is the same as the first travel start date.

7. A terminal device, comprising a processor and a memory, wherein the memory is configured to store code instructions, and the processor is configured to run the code instructions, to enable the terminal device to perform operations comprising:

displaying, a first card when the terminal device receives first travel information, wherein the first card comprises the first travel information and alarm setting information, the alarm setting information comprises a first control and a first time, and the first time is a suggested alarm time;

receiving, a first operation for the first control;

displaying, a first interface in response to the first operation, wherein the first interface is an alarm setting interface on which the first time has been selected, and the first interface comprises a second control; and setting, an alarm corresponding to the first time when a second operation for the second control is received, wherein the terminal device comprises a sensing module a calculation engine a clock and a smart assistant;

wherein the first travel information comprises a first travel start time and a first travel start position, and the displaying, a first card when the terminal device receives first travel information comprises:

registering, by the calculation engine, a travel information fence with the sensing module by using a travel association node;

when the terminal device receives the first travel information, calculating, a difference between the first travel start time and a first duration to obtain the first time, wherein the first duration is a sum of a second duration, a third duration, and a fourth duration, the second duration is a duration for traveling from a preset position to the first travel start position, the third duration is a duration for which a user needs to stay at the preset position, and the fourth duration is a duration for which the user needs to stay at the first travel start position;

obtaining, an alarm list, wherein the alarm list comprises a plurality of times; and displaying, the first card when the terminal device determines that each of the plurality of times is later than the first time;

displaying, the first card when the terminal device determines that one time in the plurality of times is earlier than the first time and that a difference between the one time in the plurality of times and the first time is greater than a first threshold; or displaying, the first card when the terminal device determines that one time in the plurality of times is earlier than the first time, that a difference between the one time in the plurality of times and the first time is less than or equal to the first threshold, and that a state of an alarm corresponding to the one time in the plurality of times is an off state, wherein the calculating, a difference between the first travel start time and a first duration to obtain the first time comprises:

integrating, a software development kit (SDK) of a map application;

obtaining, the second duration from the SDK of the map application;

calculating, the sum of the second duration, the third duration, and the fourth duration to obtain the first duration; and calculating, the difference between the first travel start time and the first duration to obtain the first time, and wherein the alarm list comprises a second time, and the calculating, the sum of the second duration, the third duration, and the fourth duration to obtain the first duration comprises:

obtaining, a plurality of fifth durations from a service platform when the terminal device determines that the second time is a wake-up alarm time and that an alarm date corresponding to the second time is within a first date period, wherein the service platform is configured to serve the terminal device, any duration in the plurality of fifth durations is a duration for which the terminal device stayed at the preset position in history after the second time, and the first date period comprises a plurality of dates of workdays;

clustering, the plurality of fifth durations to obtain a plurality of first curves;

fitting, the plurality of first curves into a second curve;

when an area ratio of one first curve in the plurality of first curves to the second curve is a maximum value, determining, a duration corresponding to the one first curve in the plurality of first curves as the third duration;

obtaining, from the service platform a plurality of durations for which the terminal device stayed at the first travel start position in history;

calculating, an average duration of the plurality of durations for which the terminal device stayed at the first travel start position in history, to obtain the fourth duration; and calculating, the sum of the second duration, the third duration, and the fourth duration to obtain the first duration, wherein the sensing module integrates the SDK of the map application, obtains the second duration from the SDK of the map application, and sends the second duration to the calculation engine;

wherein the alarm list is obtained by the calculation engine from the clock through an alarm list query interface or by using a clock node;

wherein the displaying the first card comprises drawing, by the calculation engine, the first card, sending, by the calculation engine, information used for instructing the smart assistant to display the first card, and invoking, by the smart assistant, a display to display the first card; and wherein the first interface is an alarm setting interface on which the first time is selected.

8. The terminal device according to claim 7, wherein the terminal device is further to implement the following actions:

receiving, second travel information in a case that the second operation for the second control is not received; and deleting, the first card when the terminal device determines that a state in the second travel information is a first state and that the second travel information and the first travel information meet a first condition, wherein the first state is used to indicate travel status, and the first state indicates that the travel status is refunded or the travel status is canceled.

9. The terminal device according to claim 8, wherein the second travel information comprises a second travel start position, a second travel start date, a second travel start time, and a second travel identifier, the first travel information comprises the first travel start position, the first travel start time, a first travel identifier, and a first travel start date, and that the second travel information and the first travel information meet a first condition comprises:

the second travel start time is the same as the first travel start time, the second travel identifier is the same as the first travel identifier, the second travel start position is the same as the first travel start position, and the second travel start date is the same as the first travel start date.

10. The terminal device according to claim 7, wherein the terminal device is further to implement the following actions:

receiving, second travel information in a case that the second operation for the second control is not received, wherein the second travel information comprises a second travel start time;

obtaining, a third time based on the second travel start time when the terminal device determines that a state in the second travel information is a second state and that the second travel information and the first travel information meet a second condition, wherein the third time is a suggested alarm time, the second state is used to indicate travel status, and the second state indicates that the travel status is ticket-changed; and updating, the first time in the first card to the third time.

11. The terminal device according to claim 10, wherein the second travel information further comprises a second travel start position, a second travel start date, and a second travel identifier, the first travel information comprises the first travel start position, the first travel start time, a first travel identifier, and a first travel start date, and that the second travel information and the first travel information meet a second condition comprises:

the first travel start date is the same as the second travel start date, the first travel identifier is the same as the second travel identifier, the first travel start position is the same as the second travel start position, and an absolute value of a difference between the second travel start time and the first travel start time is less than or equal to a second threshold.

12. The terminal device according to claim 7, wherein the first travel information comprises a first travel start time and a first travel start date, and the displaying, a first card when the terminal device receives first travel information comprises:

obtaining, electricity usage amounts of the terminal device in a plurality of time segments from a service platform when the first travel start time is within a first time segment, wherein the service platform is configured to serve the terminal device, and the plurality of time segments comprise a second time segment;

subtracting, a sixth duration from an initial time of the second time segment when the terminal device determines that an electricity usage amount in the second time segment is less than or equal to a third threshold, to obtain a fourth time;

displaying, the first card when the fourth time is reached on the day before the first travel start date; and deleting, the first card when the terminal device determines that the initial time of the second time segment is reached on the day before the first travel start date and that the terminal device has not received, on the first interface, the operation of confirming the alarm setting corresponding to the first time.

13. The terminal device according to claim 7, wherein the terminal device is further to implement the following actions:

after the setting an alarm corresponding to the first time, receiving, third travel information;

displaying, a second card when a state in the third travel information is a first state and that the third travel information and the first travel information meet a first condition, wherein the second card is used to suggest deleting the alarm setting corresponding to the first time, the first state is used to indicate travel status, and the first state indicates that the travel status is refunded or the travel status is canceled;

receiving a third operation for the second card;

displaying, a second interface in response to the third operation, wherein the second interface comprises a third control;

receiving a fourth operation for the third control; and deleting, the alarm corresponding to the first time in response to the fourth operation, and wherein the first travel information comprises a first travel start position, a first travel start time, a first travel identifier, and a first travel start date, the third travel information comprises a third travel start position, a third travel start date, a third travel start time, and a third travel identifier, and that the third travel information and the first travel information meet a first condition comprises:

the first travel start time is the same as the third travel start time, the third travel identifier is the same as the first travel identifier, the first travel start position is the same as the third travel start position, and the third travel start date is the same as the first travel start date.

14. A non-transitory computer-readable storage medium, wherein the computer-readable storage medium stores instructions, and when the instructions are run on a terminal device, the terminal device is enabled to perform the following actions:

displaying, a first card when the terminal device receives first travel information, wherein the first card comprises the first travel information and alarm setting information, the alarm setting information comprises a first control and a first time, and the first time is a suggested alarm time;

receiving, a first operation for the first control;

displaying, a first interface in response to the first operation, wherein the first interface is an alarm setting interface on which the first time has been selected, and the first interface comprises a second control; and setting, an alarm corresponding to the first time when a second operation for the second control is received, wherein the terminal device comprises a sensing module, a calculation engine, a clock, and a smart assistant;

wherein the first travel information comprises a first travel start time and a first travel start position, and the displaying, a first card when the terminal device receives first travel information comprises:

registering, by the calculation engine, a travel information fence with the sensing module by using a travel association node;

when the terminal device receives the first travel information, calculating, a difference between the first travel start time and a first duration to obtain the first time, wherein the first duration is a sum of a second duration, a third duration, and a fourth duration, the second duration is a duration for traveling from a preset position to the first travel start position, the third duration is a duration for which a user needs to stay at the preset position, and the fourth duration is a duration for which the user needs to stay at the first travel start position;

obtaining, an alarm list, wherein the alarm list comprises a plurality of times; and displaying, the first card when the terminal device determines that each of the plurality of times is later than the first time;

displaying, the first card when the terminal device determines that one time in the plurality of times is earlier than the first time and that a difference between the one time in the plurality of times and the first time is greater than a first threshold; or displaying, the first card when the terminal device determines that one time in the plurality of times is earlier than the first time, that a difference between the one time in the plurality of times and the first time is less than or equal to the first threshold, and that a state of an alarm corresponding to the one time in the plurality of times is an off state, wherein the calculating, a difference between the first travel start time and a first duration to obtain the first time comprises:

integrating, a software development kit (SDK) of a map application;

obtaining, the second duration from the SDK of the map application;

calculating, the sum of the second duration, the third duration, and the fourth duration to obtain the first duration; and calculating, the difference between the first travel start time and the first duration to obtain the first time, and wherein the alarm list comprises a second time, and the calculating, the sum of the second duration, the third duration, and the fourth duration to obtain the first duration comprises:

obtaining, a plurality of fifth durations from a service platform when the terminal device determines that the second time is a wake-up alarm time and that an alarm date corresponding to the second time is within a first date period, wherein the service platform is configured to serve the terminal device, any duration in the plurality of fifth durations is a duration for which the terminal device stayed at the preset position in history after the second time, and the first date period comprises a plurality of dates of workdays;

clustering, the plurality of fifth durations to obtain a plurality of first curves;

fitting, the plurality of first curves into a second curve;

when an area ratio of one first curve in the plurality of first curves to the second curve is a maximum value, determining, a duration corresponding to the one first curve in the plurality of first curves as the third duration;

obtaining, from the service platform a plurality of durations for which the terminal device stayed at the first travel start position in history;

calculating, an average duration of the plurality of durations for which the terminal device stayed at the first travel start position in history, to obtain the fourth duration; and calculating, the sum of the second duration, the third duration, and the fourth duration to obtain the first duration, wherein the sensing module integrates the SDK of the map application, obtains the second duration from the SDK of the map application, and sends the second duration to the calculation engine;

wherein the alarm list is obtained by the calculation engine from the clock through an alarm list query interface or by using a clock node;

wherein the displaying the first card comprises drawing, by the calculation engine, the first card, sending, by the calculation engine, information used for instructing the smart assistant to display the first card, and invoking, by the smart assistant, a display to display the first card; and wherein the first interface is an alarm setting interface on which the first time is selected.

* * * * *